United States Patent
Yu et al.

(10) Patent No.: US 12,524,266 B2
(45) Date of Patent: *Jan. 13, 2026

(54) DYNAMIC BATCHING FOR INFERENCE SYSTEM FOR TRANSFORMER-BASED GENERATION TASKS

(71) Applicant: FriendliAI Corp., Redwood City, CA (US)

(72) Inventors: Gyeongin Yu, Seoul (KR); Geon-Woo Kim, Seoul (KR); Joo Seong Jeong, Seoul (KR); Soojeong Kim, Seoul (KR); Byung-Gon Chun, Seoul (KR)

(73) Assignee: FRIENDLIAI CORP., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,298

(22) Filed: Aug. 21, 2023

(65) Prior Publication Data

US 2024/0231902 A1    Jul. 11, 2024

Related U.S. Application Data

(63) Continuation of application No. 17/881,549, filed on Aug. 4, 2022, now Pat. No. 11,836,520, which is a
(Continued)

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/5016* (2013.01); *G06N 5/04* (2013.01);
(Continued)

(58) Field of Classification Search
CPC ....... G06F 9/4881; G06F 9/5016; G06N 5/04; G06N 20/00; G06N 3/045; G06N 3/08
See application file for complete search history.

(56) References Cited

U.S. PATENT DOCUMENTS

| | | |
|---|---|---|
| 10,217,053 B2 | 2/2019 | Bordawekar et al. |
| 10,846,096 B1 | 11/2020 | Chung et al. |

(Continued)

FOREIGN PATENT DOCUMENTS

| | | |
|---|---|---|
| CN | 106503791 A | 3/2017 |
| CN | 108885571 A | 11/2018 |

(Continued)

OTHER PUBLICATIONS

Gao et al., "Low Latency RNN Inference with Cellular Batching," EuroSys '18, pp. 1-15. (Year: 2018).*

(Continued)

*Primary Examiner* — Kenneth Tang
(74) *Attorney, Agent, or Firm* — Fenwick & West LLP

(57) ABSTRACT

An inference system applies a machine-learning transformer model to a batch of requests with variable input length or variable target length or variable internal sate length by selectively batching a subset of operations in the transformer model but processing requests in the batch individually for a subset of operations in the transformer model. In one embodiment, the operation to be processed individually is an attention operation of an encoder or a decoder of the transformer model. By selective batching, the inference system can allow batching operations to be performed for a batch of requests with variable input or target length or internal state length to utilize the parallel computation capabilities of hardware accelerators while preventing unnecessary computations that occur for workarounds that restrain the data of a batch of requests to a same length.

34 Claims, 12 Drawing Sheets

Related U.S. Application Data continuation of application No. 17/542,193, filed on Dec. 3, 2021, now Pat. No. 11,442,775.

(51) Int. Cl.
    *G06N 5/04*     (2023.01)
    *G06N 20/00*     (2019.01)
    *G06N 3/045*     (2023.01)
    *G06N 3/08*     (2023.01)

(52) U.S. Cl.
    CPC .............. *G06N 20/00* (2019.01); *G06N 3/045* (2023.01); *G06N 3/08* (2013.01)

(56) References Cited

U.S. PATENT DOCUMENTS

| | | | |
|---|---|---|---|
| 10,990,650 B1 | 4/2021 | Vantrease et al. | |
| 11,074,412 B1* | 7/2021 | Leeman-Munk | G06N 3/08 |
| 11,282,160 B2 | 3/2022 | Barton et al. | |
| 11,442,775 B1 | 9/2022 | Yu et al. | |
| 11,521,042 B2 | 12/2022 | Ravindranath | |
| 11,544,113 B2 | 1/2023 | Wang et al. | |
| 11,568,238 B2 | 1/2023 | Huang et al. | |
| 11,716,257 B1 | 8/2023 | Khermosh et al. | |
| 11,797,535 B1 | 10/2023 | Stefani et al. | |
| 11,836,520 B2* | 12/2023 | Yu | G06F 9/5016 |
| 2017/0068889 A1 | 3/2017 | Fougner et al. | |
| 2018/0035240 A1 | 2/2018 | Ye et al. | |
| 2018/0373976 A1 | 12/2018 | Woo | |
| 2019/0130273 A1 | 5/2019 | Keskar et al. | |
| 2019/0370241 A1* | 12/2019 | Miraldo | H04L 9/0643 |
| 2020/0226453 A1 | 7/2020 | Luk et al. | |
| 2020/0311341 A1 | 10/2020 | Chaturvedi et al. | |
| 2020/0311613 A1 | 10/2020 | Ma et al. | |
| 2020/0410337 A1 | 12/2020 | Huang et al. | |
| 2021/0012199 A1 | 1/2021 | Zhang et al. | |
| 2021/0034335 A1 | 2/2021 | Svyatkovskiy et al. | |
| 2021/0109796 A1 | 4/2021 | Fozard et al. | |
| 2021/0125033 A1 | 4/2021 | Zhou | |
| 2021/0141798 A1 | 5/2021 | Steedman | |
| 2021/0192314 A1 | 6/2021 | Aarts et al. | |
| 2021/0232773 A1 | 7/2021 | Wang et al. | |
| 2021/0263779 A1 | 8/2021 | Haghighat et al. | |
| 2021/0279576 A1 | 9/2021 | Shazeer et al. | |
| 2021/0357210 A1 | 11/2021 | Clement et al. | |
| 2021/0373944 A1 | 12/2021 | Lee et al. | |
| 2021/0397610 A1 | 12/2021 | Singh et al. | |
| 2021/0406673 A1 | 12/2021 | Pardeshi et al. | |
| 2022/0066747 A1 | 3/2022 | Drain et al. | |
| 2022/0066914 A1 | 3/2022 | Drain et al. | |
| 2022/0067513 A1* | 3/2022 | Stevens | G06N 3/045 |
| 2022/0101113 A1* | 3/2022 | Tam | G06N 3/045 |
| 2022/0108212 A1 | 4/2022 | Zhai et al. | |
| 2022/0147838 A1 | 5/2022 | Gu et al. | |
| 2022/0164626 A1 | 5/2022 | Bird et al. | |
| 2022/0237368 A1 | 7/2022 | Tran | |
| 2022/0318601 A1* | 10/2022 | Yan | G06N 3/042 |
| 2023/0127306 A1* | 4/2023 | Emelyanenko | G06F 9/4881 718/101 |
| 2023/0153381 A1 | 5/2023 | Wang et al. | |
| 2023/0168922 A1* | 6/2023 | Xiaoyan | G06F 9/5027 706/12 |

FOREIGN PATENT DOCUMENTS

| | | |
|---|---|---|
| CN | 110326253 A | 10/2019 |
| CN | 110574049 A | 12/2019 |
| CN | 111898698 A | 11/2020 |
| CN | 112508018 A | 3/2021 |
| CN | 113222775 A | 8/2021 |
| CN | 113569868 A | 10/2021 |
| CN | 114127746 A | 3/2022 |
| KR | 10-2021-0145490 A | 12/2021 |
| KR | 10-2021-0148586 A | 12/2021 |
| WO | WO 2021/159201 A1 | 8/2021 |

OTHER PUBLICATIONS

Katharopoulos et al., "Transformers are RNNs: Fast Autoregressive Transformers with Linear Attention," arXiv, Aug. 31, 2020, pp. 1-17 (Year: 2020).*

Lin et al., "A Survey of Transformers", Jun. 15, 2021, arXiv, pp. 1-40. (Year: 2021).*

China National Intellectual Property Administration, Office Action with English Translation, Chinese Patent Application No. 202210994036.0, Feb. 7, 2024, 14 pages.

China National Intellectual Property Administration, Office Action with English Translation, Chinese Patent Application No. 202210994014.4, Jan. 11, 2024, 13 pages.

European Patent Office, European Examination and Communication, European Patent Application No. 22185147.0, Mar. 4, 2024, 12 pages.

Faulbrück, L. et al. "Generating Synthetic Comments to Balance Data for Text Classification" Seminar Information Systems, Feb. 7, 2020, 81 pages, Retrieved from the internet <URL: https://humboldt-wi.github.io/blog/research/information_systems_1920/text_generation/#>.

Bytedance Inc., "Effective Transformer," last edited Aug. 8, 2020, 7 pages, Retrieved from the Internet <URL:https://github.com/bytedance/effective_transformer>.

Bytedance Inc., "Running BERT without Padding," last edited Aug. 8, 2020, 7 pages, Retrieved from the Internet <URL:https://github.com/bytedance/effective_transformer#running-bert-without-padding>.

Choi, Y. et al. "Prema: A Predictive Multi-task Scheduling Algorithm for Preemptible Neural Processing Units," IEEE International Symposium on High Performance Computer Architecture, Feb. 22-26, 2020, pp. 220-233.

Dai, Z. et al. "Transformer-XL: Attentive Language Models Beyond a Fixed-Length Context," Carnegie Mellon University, Jun. 2, 2019, pp. 1-20.

Doshi, K. "Transformers Explained Visually (Part 1): Overview of Functionality", Dec. 13, 2020, Retrieved from the internet, <URL:towardsdatascience.com>.

Doshi, K. "Transformers Explained Visually (Part 2): How it works, step-by-step", Jan. 2, 2021, Retrieved from the internet, <URL:towardsdatascience.com>.

Doshi, K. "Transformers Explained Visually (Part 3): Multi-head Attention deep dive", Jan. 16, 2021, Retrieved from the internet, <URL:towardsdatascience.com>.

Doshi, K. "Transformers Explained Visually (Part 4): Not Just How, but Why They Work So Well", Jun. 2, 2021, <URL:towardsdatascience.com>.

European Patent Office, Extended European Search Report and Written Opinion, European Patent Application No. 22185149.6, Dec. 21, 2022, 10 pages.

Fang, J. et al., "Turbo Transformers: An Efficient GPU Serving System for Transformer Models," arXiv:2010.05680v4, Feb. 20, 2021, pp. 1-14.

Gao, P. et al., "Low Latency RNN Inference with Cellular Batching," EuroSys '18, Apr. 2018, pp. 1-15.

Github, "microsoft/DeepSpeed," Jan. 19, 2021, pp. 1-9, Retrieved from the Internet <URL:https://github.com/microsoft/DeepSpeed>.

Github, "NVIDIA/FasterTransformer," Apr. 2, 2021, pp. 1-28, Retrieved from the Internet <URL:https://github.com/NVIDIA/FasterTransformer>.

Github, "NVIDIA/Megatron-LM," Aug. 11, 2021, pp. 1-18, Retrieved from the Internet <URL:https://github.com/NVIDIA/Megatron-LM>.

Gschwind, M. et al., "A Better Transformer for Fast Transformer Inference," PyTorch, Jul. 12, 2022, pp. 1-4, Retrieved from the Internet <URL:https://pytorch.org/blog/a-better-transformer-for-fast-transformer-encoder-inference/>.

Gschwind, M., "Fast Transformer Inference With Better Transformer," PyTorch, Jul. 19, 2022, pp. 1-4, Retrieved from the Internet <URL:https://pytorch.org/tutorials/beginner/bettertransformer_tutorial.html>.

(56) References Cited

OTHER PUBLICATIONS

Guo, H. et al. "ATT: A Fault-Tolerant ReRam Accelerator for Attention-Based Neural Networks," IEEE 38th International Conference on Computer Design, Oct. 18-21, 2020, pp. 213-221.

Li, G. et al., "Easy and Efficient Transformer: Scalable Inference Solution for Large NLP Model," arXiv:2104.12470v4, Nov. 23, 2021, pp. 1-9.

NVIDIA Corporation, "Faster Transformer BERT," Sep. 30, 2021, 53 pages, Retrieved from the Internet <URL:https://github.com/NVIDIA/FasterTransformer/blob/main/docs/bert_guide.md#standard-bert-and-effective-fastertransformer>.

NVIDIA Corporation, "Faster Transformer," Apr. 2, 2021, 15 pages, Retrieved from the Internet <URL:https://github.com/nvidia/FasterTransformer>.

NVIDIA, "NVIDIA TensorRT," Jan. 27, 2021, pp. 1-11, Retrieved from the Wayback Machine <URL:http://web.archive.org/web/20210127111124/https://developer.nvidia.com/tensorrt>.

NVIDIA, "NVIDIA Triton Inference Server," Jan. 25, 2021, pp. 1-6, Retrieved from the Wayback Machine <URL: http://web.archive.org/web/20210125141031/https://developer.nvidia.com/nvidia-triton-inference-server>.

Olston, C. et al., "TensorFlow-Serving: Flexible, High-Performance ML Serving," arXiv:1712.06139v2, Dec. 27, 2017, pp. 1-8.

PCT International Search Report and Written Opinion, PCT Application No. PCT/IB2022/000664, Mar. 30, 2023, 10 pages.

PCT International Search Report and Written Opinion, PCT Application No. PCT/IB2022/000666, Apr. 10, 2023, 10 pages.

Pytorch, "pytorch," Dec. 2019, 14 pages, Retrieved from the Internet <URL:https://github.com/pytorch/pytorch/>.

Shazeer, N. et al., "Mesh-TensorFlow: Deep Learning for Supercomputers," arXiv:1811.02084v1, Nov. 5, 2018, pp. 1-16.

Shoeybi, M. et al., "Megatron-LM: Training Multi-Billion Parameter Language Models Using Model Parallelism," arXiv:1909.08053v4, Mar. 13, 2020, pp. 1-15.

Soojeong, K. et al. "Parallax: Sparsity-aware Data Parallel Training of Deep Neural Networks," Fourteenth EuroSys Conference, Mar. 25, 2019, pp. 1-15.

Vaswani, A. et al. "Attention Is All You Need," Advances in Neural Information Processing Systems, No. 30, Dec. 6, 2017, pp. 1-15.

Wang, X. et al., "LightSeq: A High-Performance Inference Library for Transformers," arXiv:2010.13887v4, Apr. 22, 2021, pp. 1-8.

Yan, Y. et al. "El-Attention: Memory Efficient Lossless Attention for Generation," International Conference on Machine Learning, Jul. 2021, pp. 1-11.

Zhou, H.Y. et al. "nnFormer: Interleaved Transformer for Volumetric Segmentation," arXiv preprint arXiv:2109.03201, Sep. 7, 2021, pp. 1-10.

United States Office Action, U.S. Appl. No. 17/881,549, Feb. 14, 2023, 18 pages.

Choi, Y. et al. "Lazy Batching: An SLA-Aware Batching System for Cloud Machine Learning Inference," IEEE International Symposium on High-Performance Computer Architecture, Feb. 27, 2021, 14 pages.

Exhibit A1—Initial Invalidity Contentions for U.S. Pat. No. 11,442,775 over U.S. Pat. No. 11,797,535, Titled "Use of Batch Mode Function Execution in Database Engines to Enable Efficient Calls to Remote Services" by Stefano Stefani et al., Filed Mar. 15, 2024, 59 pages.

Exhibit A2—Initial Invalidity Contentions for U.S. Pat. No. 11,442,775 over U.S. Pat. No. 11,797,535, Titled "Use of Batch Mode Function Execution in Database Engines to Enable Efficient Calls to Remote Services" by Stefano Stefani et al. and U.S. Publication No. 2023/0153381, Titled "Method and Apparatus for Length-Aware Local Tiling in a Sparse Attention Module in a Transformer" by Zhendong Wang et al., Filed Mar. 15, 2024, 66 pages.

Exhibit A3—Initial Invalidity Contentions for U.S. Pat. No. 11,442,775 over U.S. Pat. No. 11,797,535, Titled "Use of Batch Mode Function Execution in Database Engines to Enable Efficient Calls to Remote Services" by Stefano Stefani et al., U.S. Publication No. 2023/0153381, Titled "Method and Apparatus for Length-Aware Local Tiling in a Sparse Attention Module in a Transformer" by Zhendong Wang et al., and U.S. Pat. No. 11,521,042, Titled "System and Method to Dynamically and Automatically Sharing Resources of Coprocessor AI Accelerators" by Anil Ravindranath, Filed Mar. 15, 2024, 94 pages.

Exhibit A4—Initial Invalidity Contentions for U.S. Pat. No. 11,442,775 over U.S. Publication No. 2021/0192314, Titled "API for Recurrent Neural Networks" by Bastiaan Joannes Matheus Aarts et al., Filed Mar. 15, 2024, 76 pages.

Exhibit A5—Initial Invalidity Contentions for U.S. Pat. No. 11,442,775 over U.S. Publication No. 2021/0192314, Titled "API for Recurrent Neural Networks" by Bastiaan Joannes Matheus Aarts et al., U.S. Publication No. 2023/0153381, Titled "Method and Apparatus for Length-Aware Local Tiling in a Sparse Attention Module in a Transformer" by Zhendong Wang et al., and U.S. Pat. No. 11,521,042, Titled "System and Method to Dynamically and Automatically Sharing Resources of Coprocessor AI Accelerators" by Anil Ravindranath, Filed Mar. 15, 2024, 104 pages.

Exhibit A-SR—Initial Invalidity Contentions for U.S. Pat. No. 11,442,775—Disclosure of Secondary References, Filed Mar. 15, 2024, 2 pages.

Exhibit B1—Initial Invalidity Contentions for U.S. Pat. No. 11,836,520 over U.S. Pat. No. 11,797,535, Titled "Use of Batch Mode Function Execution in Database Engines to Enable Efficient Calls to Remote Services" by Stefano Stefani et al., Filed Mar. 15, 2024, 199 pages.

Exhibit B2—Initial Invalidity Contentions for U.S. Pat. No. 11,836,520 over U.S. Pat. No. 11,797,535, Titled "Use of Batch Mode Function Execution in Database Engines to Enable Efficient Calls to Remote Services" by Stefano Stefani et al. and U.S. Publication No. 2023/0153381, Titled "Method and Apparatus for Length-Aware Local Tiling in a Sparse Attention Module in a Transformer" by Zhendong Wang et al., Filed March 15, 2024, 229 pages.

Exhibit B3—Initial Invalidity Contentions for U.S. Pat. No. 11,836,520 over U.S. Pat. No. 11,797,535, Titled "Use of Batch Mode Function Execution in Database Engines to Enable Efficient Calls to Remote Services" by Stefano Stefani et al., U.S. Publication No. 2023/0153381, Titled "Method and Apparatus for Length-Aware Local Tiling in a Sparse Attention Module in a Transformer" by Zhendong Wang et al., and U.S. Pat. No. 11,521,042, Titled "System and Method to Dynamically and Automatically Sharing Resources of Coprocessor AI Accelerators" by Anil Ravindranath, Filed Mar. 15, 2024, 322 pages.

Exhibit B4—Initial Invalidity Contentions for U.S. Pat. No. 11,836,520 over U.S. Publication No. 2021/0192314, Titled "API for Recurrent Neural Networks" by Bastiaan Joannes Matheus Aarts et al., Filed Mar. 15, 2024, 239 pages.

Exhibit B5—Initial Invalidity Contentions for U.S. Pat. No. 11,836,520 over U.S. Publication No. 2021/0192314, Titled "API for Recurrent Neural Networks" by Bastiaan Joannes Matheus Aarts et al., U.S. Publication No. 2023/0153381, Titled "Method and Apparatus for Length-Aware Local Tiling in a Sparse Attention Module in a Transformer" by Zhendong Wang et al., and U.S. Pat. No. 11,521,042, Titled "System and Method to Dynamically and Automatically Sharing Resources of Coprocessor AI Accelerators" by Anil Ravindranath, Filed Mar. 15, 2024, 356 pages.

Exhibit B-SR—Initial Invalidity Contentions for U.S. Pat. No. 11,836,520—Disclosure of Secondary References, Filed Mar. 15, 2024, 2 pages.

Exhibit C—Initial Invalidity Contentions for U.S. Pat. No. 11,442,775 and U.S. Pat. No. 11,836,520—Disclosure of Invalidity Pursuant to 35 U.S.C. § 112, Filed Mar. 15, 2024, 2 pages.

United States District Court, District of Delaware, Defendant Hugging Face, Inc.'s Initial Invalidity Contentions, *Friendly AI* vs *Hugging Face, Inc.*, Case No. 1:23-cv-00816-MN, Filed Mar. 15, 2024, pp. 1-40.

Wang, Y. et al. "Energy-Efficient Inference Service of Transformer-Based Deep Learning Models on GPUs," 2020 International Conferences on Internet of Things, IEEE Green Computing and Communications, IEEE Cyber, Physical and Social Computing, IEEE Smart Data, and IEEE Congress on Cybermatics, Nov. 2, 2020, 9 pages.

Yan, Y. et al. "Fastseq: Make Sequence Generation Faster," arXiv preprint arXiv:2106.04718, Jun. 8, 2021, 9 pages.

(56) References Cited

OTHER PUBLICATIONS

Benesty, M. "Divide Hugging Face Transformers Training Time by 2 or More with Dynamic Padding and Uniform Length Batching," Medium.com, 26 pages, Retrieved from the internet <URL:https://towardsdatascience.com/divide-hugging-face-transformers-training-time-by-2-or-more-21bf7129db9q-21 bf7129db9e>.

He, P. et al. "DeBERTa: Decoding-enhanced BERT with disentangled attention," arXiv preprint arXiv:2006.03654, 2021 International Conference on Learning Representations, Oct. 6, 2021, 23 pages.

Kitaev, N. et al. "Reformer: The efficient transformer," arXiv preprint arXiv:2001.04451, 2020 International Conference on Learning Representations, Feb. 18, 2020, 12 pages.

Kosec, M. et al. "Packing: Towards 2x NLP BERT Acceleration," 2021, 12 pages.

Liu, Y. et al. "RoBERTa: A robustly optimized BERT pretraining approach," arXiv preprint arXiv:1907.11692, Jul. 26, 2019, 13 pages.

Muthuvelu, N. et al. "A dynamic job grouping-based scheduling for deploying applications with fine-grained tasks on global grids," 2005 Australasian Workshop on Grid Computing and E-Research, vol. 44, Jan. 1, 2005, 8 pages.

United States District Court, District of Delaware, Defendant Hugging Face, Inc.'s Supplemental Identification of Invalidity References, *Friendly AI* vs *Hugging Face, Inc.*, Case No. 1:23-cv-00816-MN, Filed May 29, 2024, pp. 1-41.

Wang, S. et al. "An efficient and non-intrusive GPU scheduling framework for deep learning training systems," SC20: International Conference for High Performance Computing, Networking, Storage and Analysis, Nov. 9, 2020, 13 pages.

Chinese Intellectual Property Office, Office Action, Chinese Patent Application No. 202411209059.1, May 22, 2025, 14 pages.

\* cited by examiner

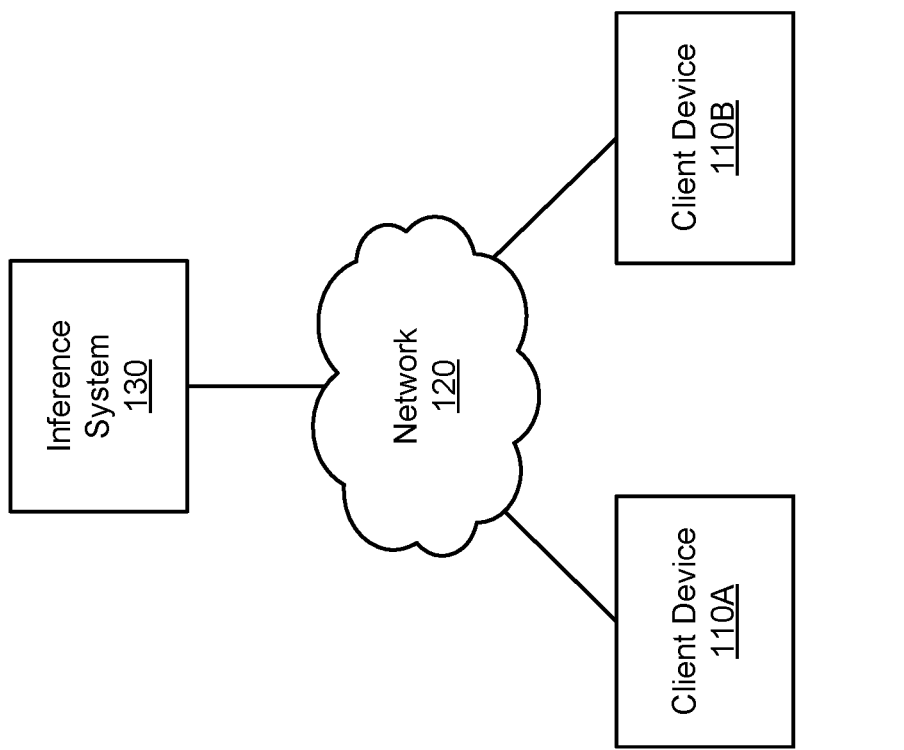

DYNAMIC BATCHING FOR INFERENCE SYSTEM FOR TRANSFORMER-BASED GENERATION TASKS

CROSS-REFERENCE TO RELATED APPLICATIONS

This application is a continuation application of U.S. patent application Ser. No. 17/881,549, filed on Aug. 4, 2022, which is continuation application of U.S. patent application Ser. No. 17/542,193, filed on Dec. 3, 2021, all of which are incorporated herein by reference in its entirety.

BACKGROUND

This invention relates generally to machine-learning transformer neural network models, and more particularly to selective batching for transformer models.

Transformer neural network models are machine-learning models used for a variety of applications, for example, natural language processing (NLP), image processing, or audio processing applications that include sequential data. For example, a transformer model may receive a sequence of input tokens that represent a query and generate a sequence of output tokens that represent a response to the query. As another example, the transformer model may receive a sequence of input tokens that represent a paragraph in German and generate a sequence of output tokens that represents a translation of the paragraph in English. As yet another example, the transformer model may receive a sequence of input tokens that represent a paragraph of text and generate a sequence of output tokens that represent a summarized version of the text.

Typically, users of client devices submit requests to an inference system. The inference system executes a machine-learning transformer model to inputs (e.g., a sequence of input tokens) of requests to generate outputs (e.g., a sequence of output tokens) for the requests. The inference system may return the outputs to client devices of the requests as a response. In one instance, the inference system executes the requests on specialized hardware accelerators such as graphics processing units (GPU's) or tensor processing units (TPU's) to improve latency and throughput, especially when the number of parameters of the transformer model is significantly large.

In one instance, the inference system processes requests in batches to achieve high processor utilization on the accelerators. Specifically, the inference system may process multiple requests in a batch together to exploit the amount of parallel computation units in the hardware accelerators. In many situations, the inputs for requests in a batch are variable in length. For example, the number of input tokens for each request in a batch may be variable in length.

However, methods of batching for transformer models often require that the length of data for multiple requests in a batch be the same to be processed. Thus, it may not be feasible to process a batch of requests with variable lengths or workarounds addressing this problem may result in using more resources compared to processing each request individually.

SUMMARY

An inference system applies a machine-learning transformer model to a batch of requests with variable input length or variable target length or variable internal state length by selectively batching a subset of operations in the transformer model but processing requests in the batch individually for a subset of operations in the transformer model. In one embodiment, the operation to be processed individually is an attention operation of an encoder or a decoder of the transformer model. By selective batching, the inference system can allow batching operations to be performed for a batch of requests with variable input or target or internal state length to utilize the parallel computation capabilities of hardware accelerators while preventing unnecessary computations that occur for workarounds that restrain the data of a batch of requests to a same length.

Specifically, in one embodiment, the inference system receives a batch of requests including one or more input token sequences. A length of a first input token sequence for a first request in the batch may be different from a length of a second input token sequence for a second request. The inference system accesses a transformer model including at least a set of decoders coupled to one another. For one or more iterations, the inference system repeatedly performs the steps of generating one or more output tokens for the requests by applying the set of decoders to one or more inputs for the requests.

For at least one decoder in the set, the inference system generates one or more queries, one or more keys, and one or more values for the requests by applying a QKV weight tensor to one or more input representations. In one instance, the queries, keys, and values are generated by a batch operation. The inference system splits at least a first query for the first request from the one or more queries, a first key for the first request from the one or more keys, and a first value for the first request from the one or more values. The inference system also splits at least a second query for the second request from the one or more queries, a second key for the second request from the one or more keys, and a second value for the second request from the one or more values.

The inference system generates a first attention output for the first request by at least combining the first query, the first key, and the first value for the first request. The inference system also separately generates a second attention output for the second request by at least combining the second query, the second key, and the second value for the second request. The inference system concatenates at least the first attention output and the second attention output into a concatenated tensor and generates one or more output representations by applying a weight tensor to the concatenated tensor. In one instance, the one or more output representations are generated by a batch operation. The inference system sets the one or more output tokens as the one or more inputs to the set of decoders for the next iteration and provides output tokens generated for at least one request to a client device as a response to the at least one request.

In one embodiment, the inference system performs iteration-level dynamic batching for a transformer model that allows the inference system to dynamically modify a batch of requests being executed on an execution engine. Specifically, in existing batching methods for transformer models, it is difficult to modify a batch of requests once it has started to process on an execution engine. This is because certain methods of batching require the length of the inputs or the length of the internal states to be the same across all requests in the batch. Therefore, unless new incoming requests have the same length of inputs as the batch of requests being executed on the execution engine, it may be difficult for the inference system to modify the batch to, for example, add or remove new requests to the batch.

By performing selective batching, the inference system can monitor and modify a batch being processed on the execution engine on an iteration-level and update the batch between iterations as requests get completed and new requests are received. Specifically, at one or more iterations, the inference system can modify the batch being executed on the execution engine by adding new incoming requests to the batch or removing completed requests from the batch. This is because selective batching allows requests with variable lengths to be processed without restraining the one or more inputs or internal states to the transformer model to same lengths. This allows the inference system to remove requests in the batch that are completed earlier than others so that the response can be provided to the user faster and allows the inference system to add new requests to a batch of requests if the execution engine is being under-utilized.

In one embodiment, a serving system of the inference system receives one or more requests for execution. The serving system may include a request processor and a scheduler each coupled to one or more execution engines for executing a machine-learning transformer model including at least a set of decoders. The scheduler schedules a batch of requests including the one or more requests for execution on an execution engine. The execution engine generates a first set of output tokens by iteratively applying the transformer model to a first set of inputs for the batch of requests. In one instance, applying the transformer model includes applying at least one batch operation to one or more input tensors associated with the batch of requests.

The serving system may receive a new request from a client device that includes a sequence of input tokens. The scheduler schedules a second batch of requests including the one or more requests and the new request for execution on the execution engine responsive to determining that the execution engine has memory available to execute the second batch of requests. The execution engine generates a second set of output tokens by iteratively applying the transformer model to a second set of inputs for the second batch of requests. The second set of inputs may include the sequence of input tokens for the new request.

BRIEF DESCRIPTION OF THE DRAWINGS

FIG. 1 is a high-level block diagram of a system environment for an inference system, in accordance with an embodiment.

Figure 2A:
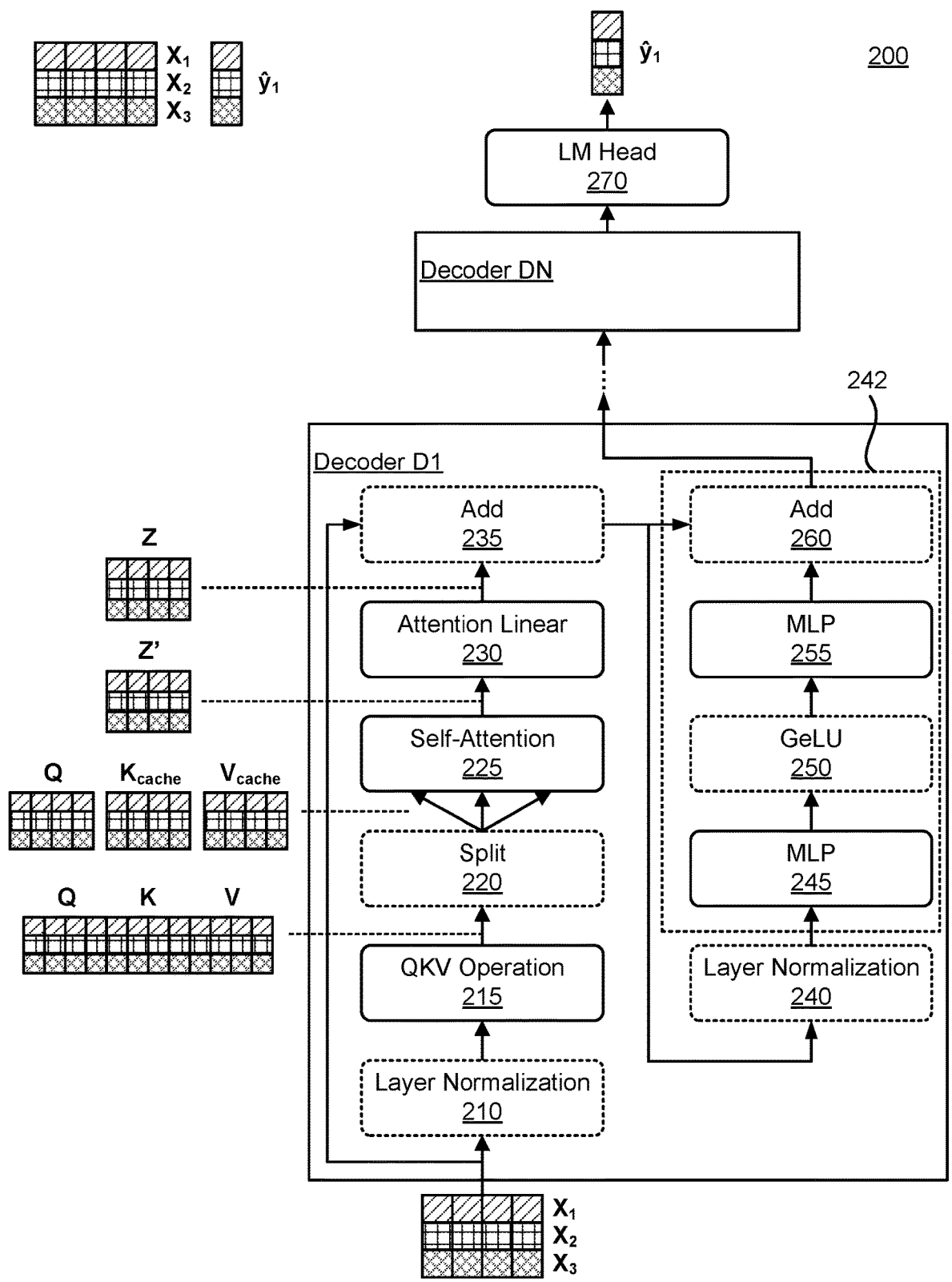
FIGS. 2A-2B illustrate a method of batching using a machine-learning transformer model, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

FIG. 1 is a high-level block diagram of a system environment 100 for an inference system 130, in accordance with an embodiment. The system environment 100 shown by FIG. 1 includes one or more client devices 110A, 110B, a network 120, and an inference system 130. In alternative configurations, different or additional components may be included in the system environment 100.

The inference system 130 receives requests from client devices 110A, 110B to perform tasks using machine-learning models. In one embodiment, the machine-learning models are transformer neural network models. The tasks may include, but are not limited to, natural language processing (NLP), image processing, audio processing applications. Specifically, the transformer model may be appropriate for processing sequential data that can be tokenized into a sequence of input tokens for the request and a sequence of output tokens for the desired response. The inference system 130 receives a request including input data (e.g., text data, image or video data, audio data) and encodes the input data to a set of input tokens. The inference system 130 repeatedly applies the machine-learning transformer model for one or more iterations to generate a set of output tokens. The inference system 130 decodes the set of output tokens to output data and returns the output data as the response to the request. While for applications such as NLP applications, a sequence of input tokens or output tokens are arranged along one dimension (1-D) to represent, for example, a sequence of words, it is appreciated that in other embodiments, a sequence of input tokens or output tokens may be a multi-dimensional sequence. For example, for two-dimensional image data, the sequence of tokens may be a two dimensional (2-D) sequence arranged along both a first direction (e.g., X-axis) and a second direction (e.g., Y-axis), where each token corresponds to a block of one or more pixels in the image.

In particular, NLP tasks involve using artificial intelligence and machine learning techniques to analyze language and may include a variety of tasks including translation, sentiment analysis, text summarization, auto-correction, and the like. When processing NLP tasks, the inference system 130 receives a request including input text of a sequence of words (e.g., query) and encodes the input text to a sequence of input tokens that each represent a respective word in a latent space. The inference system 130 repeatedly applies a transformer model for one or more iterations to generate a sequence of output tokens (e.g., response to query). The output tokens are converted to output text as a response to the request.

For example, a transformer model may receive a sequence of input tokens that represent a query and generate a sequence of output tokens that represent a response to the query. As another example, the transformer model may receive a sequence of input tokens that represent a paragraph in French and generate a sequence of output tokens that represents a translation of the paragraph or sentence in English. As yet another example, the transformer model may receive a sequence of input tokens that represent a paragraph of text and generate a sequence of output tokens that represents a summarized version of the text.

In one embodiment, the inference system 130 includes one or more execution engines that are built on specialized hardware accelerators such as graphics processing units (GPU's) or tensor processing units (TPU's). The requests are executed on the execution engines. Specifically, execution of machine-learning neural network models, such as transformer models, involve a significant number of operations, such as tensor multiplication between input data and high-dimensional weight tensors that can be computationally intensive. The hardware accelerators of the execution engines may be optimized to perform these operations efficiently by parallel processing, leading to significant improvement in latency or throughput when the number of parameters in the transformer model are large.

The hardware of the inference system 130 may include one or more central processing unit (CPU) cores, CPU memory (e.g., DRAM), data storage, one or more execution engines (e.g., GPU devices). Each execution engine may include a set of cores (e.g., GPU cores) coupled to local memory (e.g., GPU memory), and may be composed of one or more hardware accelerators. In addition, the inference system 130 may be composed of multiple hardware components and components for configuring a network to connect the various components across the multiple hardware components together such that the components can coordinate with each other to process requests. For example, one execution engine may communicate with multiple hardware accelerators on multiple machines. An execution engine may process data that is stored on its local memory. Specifically, during training or inference of the transformer model, data required for inference or training is read from an input file in the data storage by the CPU or across the network 120 from, for example, a client device 110, moved to local memory of an execution engine, and processed by the execution engine. The results of the processing are retrieved by the CPU.

In one embodiment, the inference system 130 processes requests by batches to achieve higher processor utilization on the hardware accelerators. Specifically, the inference system 130 processes multiple requests in a batch together to exploit the amount of parallel computation units in the execution engines. In such an embodiment, the inference system 130 receives multiple requests each associated with an input token sequence. The inference system 130 iteratively applies the transformer model to the batch of requests to generate the output tokens for the requests together. In one instance, batching for a transformer model is made possible by grouping requests that have the same length of input token sequences together or at each iteration, treating requests in the batch as if they all had the same input token sequence lengths as the request with the shortest length.

Transformer Model with Batching

Figure 2B:
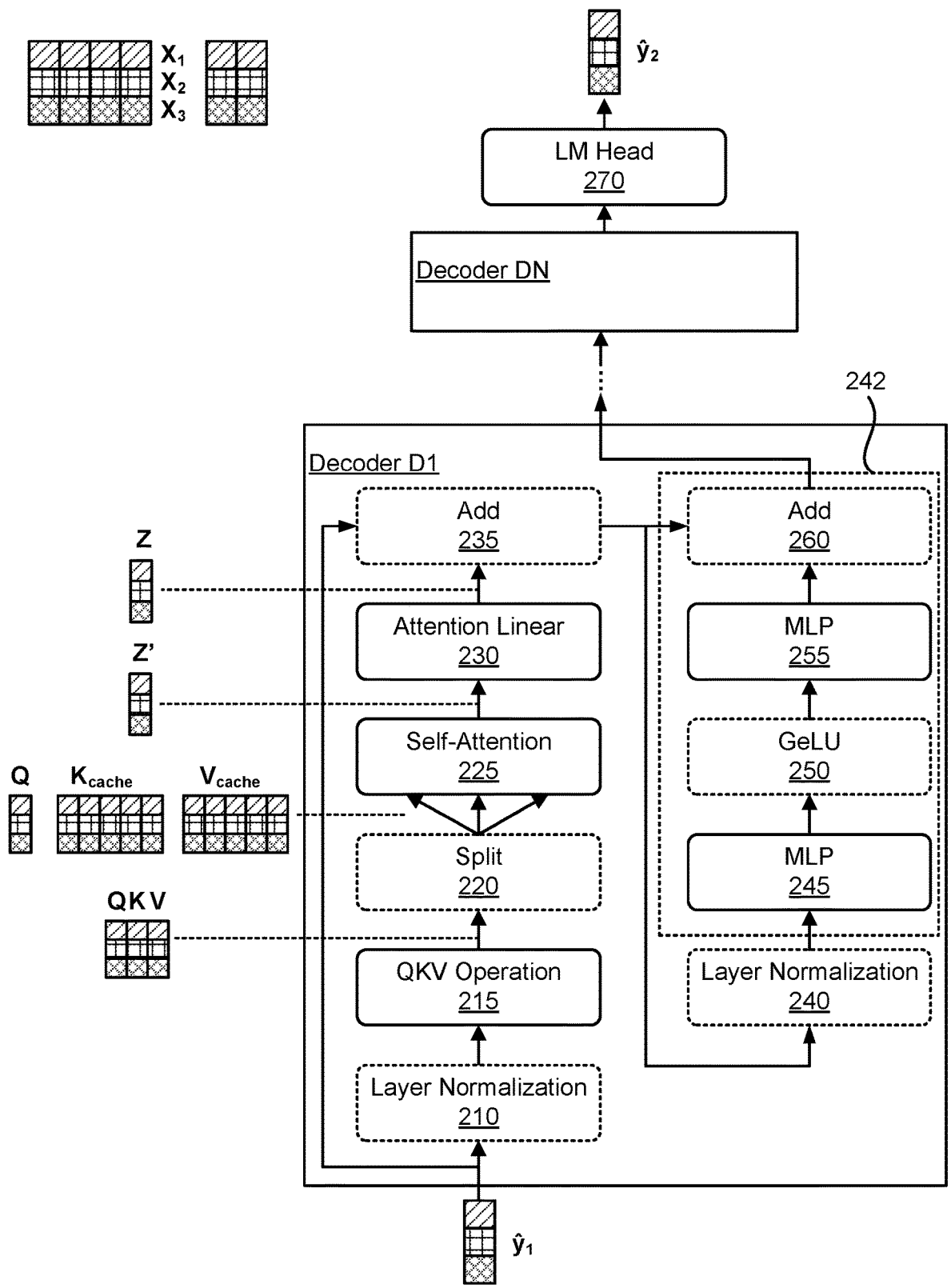

FIGS. 2A-2B illustrate a method of batching using a machine-learning transformer model 200, in accordance with an embodiment. In particular, the transformer model 200 is associated with a set of parameters determined through a training process. The transformer model 200 is coupled to receive one or more inputs (e.g., input token sequences or output tokens of previous iteration) and generate one or more outputs (e.g., output token predictions). Specifically, in one embodiment, a request is processed by applying the transformer model to the input token sequence of the request in one iteration of an "encoding phase," and applying the transformer model to an output token sequence generated at a previous iteration for one or more iterations of a "decoding phase." In a decoding phase, the output tokens of a previous iteration are set as inputs for a next iteration, and the process is repeated for additional iterations of the decoding phase until an end token (e.g., period "." or an "<end>" indicator) is generated for each request in the batch signaling that all predictions have been generated for a respective request. In other embodiments, the termination criteria for a request may be to terminate after a maximum number of output tokens are generated or may be other types of conditions that are specified by, for example, the inference system 130 or users of the client devices 110.

FIG. 2A illustrates an encoding phase for the transformer model 200, in which the set of input token sequences are processed to generate one or more output tokens. In the example shown in FIG. 2A, the inference system 130 processing requests for a chatbot receives a first request as the question "what is your name?," a second request as the question "what is the time?," and a third request as the question "how do I pay?" The inference system 130 encodes each of the requests as a respective set of input token sequences. The first request is encoded to an input token sequence $X_1$, the second request is encoded to an input token sequence $X_2$, and the third request is encoded to an input token sequence $X_3$, each request being illustrated with a different fill pattern in the figures. Each input token sequence in FIG. 2A is a one-dimensional sequence in which a sequence of tokens are arranged along a single dimension (e.g., X-direction). However, as described above with respect to FIG. 1, it is appreciated that in other embodiments, a sequence of tokens may be arranged as a multi-dimensional sequence.

As shown in FIG. 2A, since each request includes four words, each input token sequence includes four tokens each token representing a respective word. For example, input token sequence $X_1$ for the first request is represented by four squares that represent words "what," "is," "your," "name." Specifically, while each word is mapped to a single square, in practice, the inference system 130 represents a token for a word as an embedding that represents the word in a multi-dimensional latent space. Thus, while each input token sequence is visually illustrated as a two-dimensional 1×4 tensor in FIG. 2A, in practice, each input token sequence may be represented as a three-dimensional tensor 1×4×H where H is the dimension of an embedding (e.g., direction going in or out of the page). Moreover, while each token (input token or output token) is mapped to one word for the remainder of the specification, this is merely an example, and it is appreciated that in other embodiments, each token may be mapped to different text units, combination of text units, and the like. For example, in other embodiments, each token may be mapped to a text unit of multiple words, paragraphs, sentences, n-grams or may be mapped to a punctuation mark (e.g., "?," "!," ":") in addition to text units.

In one embodiment, the transformer model 200 includes a set of N decoders D1, D2, . . . , DN. A decoder is coupled to receive a set of input representations and generate a set of output representations. For example, the first decoder D1 is coupled to receive the one or more inputs to the transformer model 200 as the set of input representations and generate a set of output representations. Each subsequent decoder is coupled to receive the set of output representations of a previous decoder and generate another set of output representations. For example, the second decoder D2 placed after the first decoder D1 is coupled to receive the set of output representations generated by the first decoder D1 and generate another set of output representations. This process is repeated until the set of output representations for the final decoder are generated.

The transformer model 200 may also include a LM head block 270 that is coupled to receive the set of output representations from the final decoder DN and generate one or more output tokens as the outputs for the current iteration. In the example illustrated in FIG. 2A, the LM head 270 receives the set of output representations from a final decoder DN and generates one or more output tokens for the batch of requests in the forms of a tensor $\hat{y}_1$. Specifically, tensor $\hat{y}_1$ includes a first output token for the first request that represents the first word prediction "my" for the response, a second output token for the second request that represents the word prediction "the" for the response, and a third output token for the third request that represents the word prediction "you" for the response.

FIG. 2B illustrates a decoding phase for the transformer model 200, in which the previous output tokens are processed as inputs to generate one or more additional output tokens. Different from the encoding phase, the transformer model 200 is applied to output tokens generated at a previous iteration as inputs to generate the additional output tokens. As shown in FIG. 2B, the transformer model 200 at the next iteration receives the output tokens $\hat{y}_1$ generated at the previous iteration and generates additional output tokens $\hat{y}_2$ for the requests as outputs. The decoding phase is repeated until the termination criteria is satisfied for each request in the batch.

The transformer model 200, and in particular, each decoder Di in the set of decoders D1, D2, . . . , DN include one or more blocks that each represent a respective operation, in particular a tensor operation. Specifically, a block in the transformer model 200 may contain data for performing an operation to one or more input tensors for a request to generate one or more output tensors for the request. When an operation is executed on an execution engine, the one or more input tensors and associated data (e.g., weight tensors) for the operation may be read from the local memory of the execution engine. The operation may be executed using the one or more input tensors and the associated data to generate one or more output tensors. The output tensors are provided to the CPU, to another execution engine, or may be stored on the local memory of the execution engine such that it can be used for the next operation.

In one embodiment, the operations of the transformer model 200 are configured as batch operations in which data for a batch of requests are processed together. A batch operation is coupled to receive one or more input tensors that are each concatenations of input data for multiple requests in a batch. The batch operation generates one or more output tensors that are each concatenations of output data for the multiple requests in the batch by applying the respective operation to the one or more input tensors. For a batch operation, an input tensor may be a concatenation of the input tensor for each respective request in the batch. Thus, the input tensor for the batch operation is a single, larger tensor that coalesces the input tensors for each request in the batch across an additional batch dimension.

Similarly, an output tensor from a batch operation may be represented as the concatenation of output tensors for each respective request in the batch. Thus, while an output tensor for an individual request can also be generated by applying the operation to the input tensor for the request, an output tensor generated from a batch operation using a concatenated input tensor is also a single, larger tensor that coalesces the output tensors for each request in the batch across the batch dimension.

Moreover, certain operations, such as tensor multiplication operations, involve multiplying a set of parameters (e.g., weight tensors) of the transformer model 200 with the input tensors for the batch operation. In some instances, when the requests are processed individually, a weight tensor is read from the local memory of a hardware accelerator each time an input tensor for a request is multiplied by the weight tensor. In contrast, when executing the tensor multiplication as a batch operation, the set of parameters are read once and re-used for operation on the concatenated input tensor. This can lead to significant improvement in throughput compared to processing the requests individually. However, in the batching process of FIGS. 2A-2B, each request may be required to have the same length in an input tensor and an internal state tensor since the input data for the batch are processed as a single tensor.

As shown in FIG. 2A, a decoder in the transformer model 200 includes a first layer normalization block 210, a QKV operation block 215, a split block 220, a self-attention block 225, an attention linear block 230, a first add block 235, a second layer normalization block 240, a first MLP block 245, a GeLU block 250, a second MLP block 255, and a second add block 260. In one embodiment, each of the blocks in the decoder are performed on an execution engine as a batch operation, in which input tensors for the batch operation are a concatenation of the input data for the batch of requests and the output tensors are a concatenation of the output data for the batch of requests. While the operations in the first decoder D1 are described as an example, it is appreciated that the remaining decoders in the set may also include similar operations as the first decoder D1.

Specifically, the inference system 130 concatenates the input token sequences $X_1$, $X_2$, $X_3$ into a concatenated input tensor. The layer normalization block 210 is coupled to receive the concatenated input tensor and normalize the elements of each request to generate a normalized tensor as the output tensor. The QKV operation block 215 is coupled to receive the normalized tensor as an input tensor and generate an output tensor including queries, keys, values for the requests. Specifically, the QKV operation block 215 generates the queries, keys, and values by applying a QKV weight tensor that is a trained set of parameters of the transformer model 200 to the normalized tensor that includes normalized data for each request to generate an output tensor that includes the queries, keys, and values for each request in the batch. For example, as shown in FIG. 2A, the first row of the output tensor of the QKV operation 215 includes the query, key, value (in a concatenated form) for the first request, the second row includes the query, key, value for the second request, and so on. In one embodiment, instead of applying a single QKV weight tensor, the QKV operation block 215 may be associated with separate weight tensors that are each applied to the input tensor to separately generate the queries, keys, and values. For example, the QKV operation block 215 may apply a query weight tensor to the input tensor to generate the queries for the requests, a separate key weight tensor to the input tensor to generate the keys for the requests, and a separate value weight tensor to the input tensor to generate the values for the requests.

The split block 220 is coupled to receive the output tensor from the QKV operation block 215 and split the output tensor into a query tensor, a key tensor, a value tensor for the current iteration, in the case that these tensors are not generated separately. The query tensor includes the queries for the batch of requests, the key tensor includes the keys for the batch of requests, and the value tensor includes the values for the batch of requests for the current iteration. In one instance, the execution engine maintains an internal state for the batch of requests as a key cache tensor for caching the keys generated at previous iterations and the current iteration, and a value cache tensor for caching the values that were generated at previous iterations and the current iteration. The inference system 130 adds the key tensor for the current iteration to the key cache tensor and the value tensor for the current iteration to the value cache tensor.

The self-attention block 225 is coupled to receive the query tensor, the key cache tensor, and the value cache tensor as the input tensors and generate an output tensor including attention outputs for requests in the batch. In one instance, the attention output tensor is generated by multiplying the query tensor with the key cache tensor to generate a multiplied tensor and multiplying the multiplied tensor with the value cache tensor. When the self-attention block 225 is executed as a batch operation, the query tensor and the key cache tensor may be multiplied on the execution engine to generate the multiplied tensor. The value cache tensor and the multiplied tensor may be multiplied to generate the attention output tensor. The attention output tensor includes attention outputs for the requests in the batch. For example, in FIG. 2A, the first row of the attention output tensor Z' is the attention output for the first request, the second row of the attention output tensor Z' is the attention output for the second request, and so on.

The attention linear block 230 is coupled to receive the attention output tensor as the input tensor and generates an output tensor by applying an attention weight tensor that is a trained set of parameters of the transformer model 200 to the attention output tensor. The attention linear block 230 is configured as a batch operation. For example, in FIG. 2A, the first row of the output tensor Z may be the output data for the first request, and the second row of the output tensor Z may be the output data for the second request, and so on. The first add block 235 combines the concatenated input tensor with the input token sequences and the output tensor from the attention linear block 230 to generate a combined tensor. The second layer normalization block 240 is coupled to receive the combined tensor from the add block 235 and normalize elements of each request to generate a normalized tensor as the output tensor.

The decoder further includes a multi-layer perceptron (MLP) block 242 that includes one or more blocks including additional neural network layers. In one embodiment, the MLP block 242 includes a first MLP block 245 coupled to receive the normalized tensor from the second layer normalization block 240 as the input tensor and generate an output tensor by applying a MLP weight tensor that is a trained set of parameters of the transformer model 200 to the normalized tensor. The MLP block 242 includes a GeLU block 250 coupled to receive the output tensor from the first MLP block 245 as the input tensor and generate an output tensor by applying a GeLU function to the input tensor. The MLP block 242 includes a second MLP block 255 coupled to receive the output tensor from the GeLU block 250 as the input tensor and generate an output tensor by applying a second MLP weight tensor that is a trained set of parameters of the transformer model 200.

The combined tensor from the second add block 260 may be obtained as the set of output representations generated for the first decoder D1. Subsequently, the second decoder D2 placed after the first decoder D1 is coupled to receive the set of output representations from the first decoder D1 and repeats similar operations to generate another set of output representations. This process is repeated until the set of output representations from the final decoder DN are generated. Specifically, while each decoder may involve similar operations as the first decoder D1, the trained set of parameters that are associated with the operations may be different from decoder to decoder. The LM head block 270 is coupled to receive the set of output representations from the final decoder DN as an input tensor and generates an output tensor $\hat{y}_1$ including the one or more output tokens.

As described in conjunction with FIG. 2B, the next iteration is a decoding phase in which the output tokens generated at the previous iteration are inputs to the transformer model 200. The transformer model 200 generates another set of output tokens. The layer normalization block 210 is applied to the output tensor $\hat{y}_1$ to generate a normalized tensor. The QKV operation block 215 is applied to the normalized tensor to generate an output tensor including the queries, keys, values for the current iteration. The split block 220 is applied to split the output tensor into a query tensor, a key tensor, a value tensor. The inference system 130 adds the key tensor for the current iteration to the key cache tensor and adds the value tensor for the current iteration to the value cache tensor. Thus, during the iteration shown in FIG. 2B, the key cache tensor Kcache includes the keys of the previous iterations and the current key tensor K, and the value cache tensor Vcache includes the values of the previous iterations and the current value tensor V.

The self-attention block 225 is applied to the query tensor, the key cache tensor, and the value cache tensor for the current iteration to generate the attention output tensor. The attention linear block 230 is applied to the attention output tensor to generate an output tensor. The add block 235 combines the inputs and the output tensor from the attention linear block 230 to generate a combined tensor. The MLP block 242 is applied to the combined tensor to generate the set of output representations for the decoder D1. This process is repeated for the remaining decoders and the LM head 270 to generate an output tensor $\hat{y}_2$ including another set of output tokens, and the transformer model 200 is iteratively applied until the termination criteria is satisfied for each request in the batch.

Transformer Model with Selective Batching

In many instances, the inputs for requests or the internal states for the requests are variable in length and may be difficult to batch using, for example, the batching method in FIGS. 2A-2B. For example, the number of input tokens between different NLP requests are highly likely to vary in length depending on the input text and the type of request. For example, the length of a first query request may be different from the length of a second query request since different users synthesize language differently. However, methods of batching transformer models, such as the method described in conjunction with FIGS. 2A-2B, require that the lengths of input tensors for the batch be the same since the input tensors have to be coalesced into a single concatenated tensor for an operation. Thus, if the lengths of input tensors are different for multiple requests, it may not be feasible to process the requests as a batch using the batching method of FIGS. 2A-2B.

In addition, a workaround addressing this problem is to treat the input token sequences during the encoding phase as if the requests had the same lengths as the input token sequence with the shortest length (i.e., least number of tokens). However, this requires the inference system 130 to discard output tokens generated for requests with longer input lengths at subsequent iterations since the original input tokens received for the request have to be substituted in the respective elements. This results in inefficiency and waste of unnecessary resources because an inference system processes the input token sequences for longer requests separately in multiple iterations instead of a single iteration. Another workaround may be to treat the input token sequences as if the requests had the same lengths as the input token sequence with the longest length (i.e., largest number of tokens). However, this requires the inference system to increase the size of the input tensors to match the request with the longest token sequence (and pad the remaining elements). This results in redundant computation since the inference system processes a larger input tensor throughout the process of executing the transformer model. For example, in some cases, the number of iterations required to process a batch of requests using the method of FIGS. 2A-2B may be significantly larger than the number of iterations to process each request individually.

Thus, in one embodiment, the inference system 130 trains and applies a machine-learning transformer model to a batch of requests with variable input length or target length or internal state length using a selective batching method. In the selective batching method, the inference system 130 selectively batches a subset of operations in the transformer model but separately processes requests individually for a subset of operations in the transformer model that are not compatible with batching. In one embodiment, the operation to be processed separately is the attention operation of an encoder or a decoder of the transformer model. By selective batching, the inference system 130 can allow batching operations to be performed for a batch of requests with variable input or target length or internal state length to utilize the parallel computation capabilities of hardware accelerators while preventing problems that occur in workarounds.

Figure 3A:
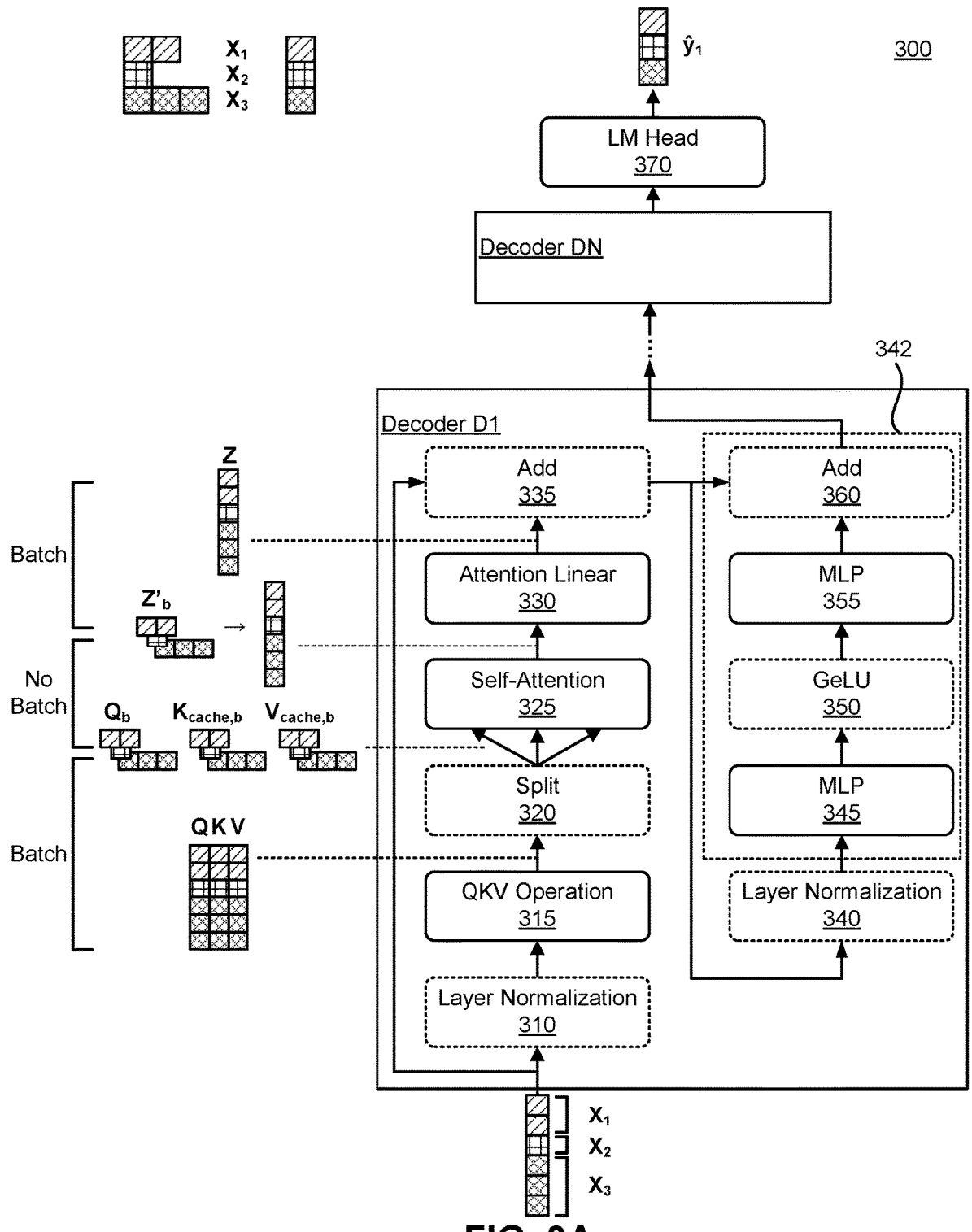
FIGS. 3A-3B illustrate a method of selective batching using a machine-learning transformer model, in accordance with an embodiment.
Figure 3B:
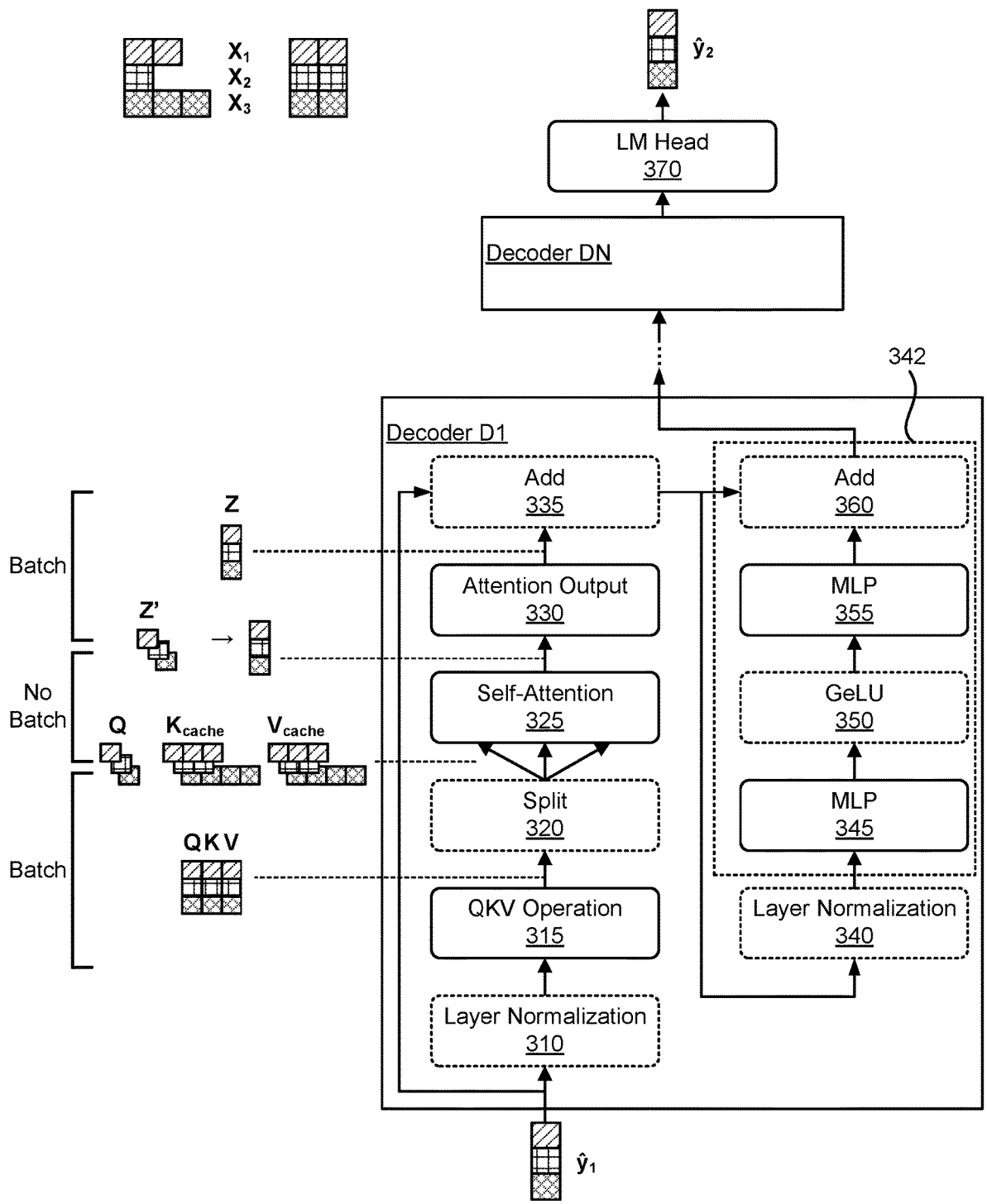

FIGS. 3A-3B illustrate a method of selective batching using a machine-learning transformer model 300, in accordance with an embodiment. In the example shown in FIG. 3A, the inference system 130 receives a batch of requests with input token sequences having different lengths, different from FIG. 2A. In FIG. 3A, the inference system 130 receives a first request as the question "what's up?," a second request as the question "hello?," and a third request as the question "how are you?" each having different lengths of words. The inference system 130 encodes each of the requests as a respective set of input token sequences. The first request is encoded to an input token sequence $X_1$, the second request is encoded to an input token sequence $X_2$, and the third request is encoded to an input token sequence $X_3$.

The transformer model 300 shown in FIGS. 3A-3B also includes a set of N decoders D1, D2, . . . , DN and a LM head block 370. However, different from the transformer model 200 of FIGS. 2A-2B, a subset of operations in the transformer model 300, specifically operations in the self-attention operation block 325, are executed separately instead of being processed as a batch operation. As shown in FIG. 3A, the transformer model 300 includes a first layer normalization block 310, a QKV operation block 315, a split block 320, a self-attention block 325, an attention linear block 330, a first add block 335, a second layer normalization block 340, a first MLP block 345, a GeLU block 350, a second MLP block 355, and a second add block 360.

Specifically, in the selective batching method, the inference system 130 may concatenate the input token sequences $X_1$, $X_2$, $X_3$ into a concatenated input tensor. Different from the batching method in FIGS. 2A-2B, the inference system 130 concatenates the input token sequences such that individual input tokens for the batch of requests are concatenated across one dimension, for example, the vertical dimension in FIGS. 3A-3B. When input token sequences with different lengths are input to the transformer model 300, one way to concatenate the sequences into a concatenated tensor with the same dimensionality for the requests in the batch is to concatenate the input tokens for the requests across a single dimension. Thus, the concatenated tensor in FIG. 3A is illustrated as a $\Sigma L_b \times 1$ tensor in FIG. 3A, where $\Sigma L_b$ denotes the total sum of the token lengths over each request b in the batch, in which the length of input tokens for request b is given by $L_b$. In practice, the concatenated input tensor may be a $\Sigma L_b \times 1 \times H$ tensor where H is the dimension of an embedding.

The first layer normalization block 310 is applied to the concatenated input tensor to generate a normalized tensor that normalizes elements of each request. In one instance, the operation of the first layer normalization block 310 is given by:

$$Y_{i,j} = \frac{X_{i,j} - E[X_{i,:}]}{\sqrt{\text{Var}[X_{i,:}] + \epsilon}} \cdot \gamma_j + \beta_j$$

where $X \in \mathbb{R}^{\Sigma L_b \times H}$ represents the concatenated input tensor and $Y \in \mathbb{R}^{\Sigma L_b \times H}$ represents the normalized tensors, $\epsilon$ is a constant, and $\gamma$, $\beta \in \mathbb{R}^H$.

The QKV operation block 315 is applied to the normalized tensor as an input tensor to generate an output tensor including the queries, keys, values for the requests. The QKV operation block can be configured as one or more neural network layers. Specifically, the QKV operation block 315 generates the queries, keys, and values by applying a QKV weight tensor that is a trained set of parameters of the transformer model 300 to the normalized tensor. In one instance, the operation of the QKV operation block 315 is given by:

$$Y_{i,j} = \left( \sum_{k=1}^{H} X_{i,k} \cdot W_{k,j}^{QKV} \right) + \text{bias}_j$$

where $X \in \mathbb{R}^{\Sigma L_b \times H}$ represents the normalized tensor from the first layer normalization block 310, $Y \in \mathbb{R}^{\Sigma L_b \times 3H}$ represents the output tensor containing the queries, keys, and values, $W^{QKV} \in \mathbb{R}^{H \times 3H}$ is the QKV weight tensor, and bias $\in \mathbb{R}^{3H}$.

In particular, the QKV operation block 315 in the selective batching method may be configured as a batch operation and the QKV weight tensor is multiplied with the normalized tensor from the layer normalization block 310 to generate the output tensor that includes the queries, keys, and values for the batch of requests. Because of the shape of the concatenated input tensor, the output tensor of the QKV operation 315 may also be arranged such that each query element for the requests are concatenated along one dimension, for example, the vertical dimension, each key element for the requests are concatenated along the one dimension, and each value element for the requests are concatenated along the one dimension. For example, as shown in FIG. 3A, the first and second rows of the output tensor of the QKV operation 315 corresponds to the query, key, value for the first request, the third row corresponds to the query, key, value for the second request, and the fourth through sixth rows correspond to the query, key, value for the third request. Similarly, the QKV operation block 315 may generate the queries, keys, and values separately by applying a query tensor, a separate key tensor, and a separate value tensor to the input tensor. In one embodiment, the QKV operation block 315 includes multiple attention heads, and the queries, keys, and values are generated for each attention head. In such an instance, when the QKV operation block 315 includes n attention heads, H may be equal to n×h, where h is the dimensionality of the latent space per attention head.

The split block 320 is coupled to receive the output tensor from the QKV operation block 315 and split the output tensor into a query tensor, a key tensor, a value tensor for the current iteration. In one instance, an operation of the split block 320 is given by:

$$Q_{i,j} = X_{i,j}, K_{i,j} = X_{i,H+j}, V_{i,j} = X_{i,2H+j}$$

where $X \in \mathbb{R}^{\Sigma L_b \times 3H}$ represents the output tensor from the QKV operation block 315, $Q \in \mathbb{R}^{\Sigma L_b \times H}$ represents the query tensor, $K \in \mathbb{R}^{\Sigma L_b \times H}$ represents the key tensor, $V \in \mathbb{R}^{\Sigma L_b \times H}$ represents the value tensor. When the QKV operation block 315 includes multiple attention heads, the query tensor may include n queries for each request, the key tensor may include n keys for each request, and the value tensor may include n values for each request.

Different from the batching method of FIG. 2A, the split block 320 further splits the query tensor Q to queries for each request, the key tensor K to keys for each request, and the value tensor V to values for each request. In one instance the per-request split operation of the split block 320 is given by:

$$Q_{1\,i,j} = Q_{i,j}, Q_{2\,i,j} = Q_{L_1+i,j}, \ldots Q_{B\,i,j} = Q_{L_1+\ldots+L_{B-1}+i,j}$$

where $Q_1, Q_2, \ldots, Q_B$ are queries for individual requests, and $Q_1 \in \mathbb{R}^{L_1 \times H}$, $Q_2 \in \mathbb{R}^{L_2 \times H}$, ..., $Q_B \in \mathbb{R}^{L_B \times H}$, $$K_{1\,i,j} = K_{i,j}, K_{2\,i,j} = K_{L_1+i,j}, \ldots K_{B\,i,j} = K_{L_1+\ldots+L_{B-1}+i,j}$$

where $K_1, K_2, \ldots, K_B$ are keys for individual requests, and $K_1 \in \mathbb{R}^{L_1 \times H}$, $K_2 \in \mathbb{R}^{L_2 \times H}$, ..., $K_B \in \mathbb{R}^{L_B \times H}$, $$V_{1\,i,j} = V_{i,j}, V_{2\,i,j} = V_{L_1+i,j}, \ldots V_{B\,i,j} = V_{L_1+\ldots+L_{B-1}+i,j}$$

where $V_1, V_2, \ldots, V_B$ are queries for individual requests, and $V_1 \in \mathbb{R}^{L_1 \times H}$, $V_2 \in \mathbb{R}^{L_1 \times H}$, ..., $V_B \in \mathbb{R}^{L_1 \times H}$.

Moreover, for each request b=1, 2, ..., B, the inference system 130 maintains an internal state for the request in the form of a key cache tensor Kcache, and a value cache tensor $Vcache_b$, where $Kcache_b \in \mathbb{R}^{L_{b,curr} \times H}$ and $Vcache_b \in \mathbb{R}^{L_{b,curr} \times H}$ and $L_{b,curr}$ is the current length of the token sequence (including both the input tokens and output tokens) of the request b. In other embodiments, the internal state for a request may contain different types of information from the keys and values for the request and embodiments are not limited hereto. Thus, $L_{b,curr}$ is equal to $L_b$ for the encoding phase. The inference system 130 adds the key tensor $K_b$ to the respective key cache tensor and the value tensor $V_b$ to the respective value cache tensor for the request. Because the set of inputs (i.e., input token sequences for $X_1$, $X_2$, $X_3$) for the batch of requests have different lengths, the length of the internal state for the requests in the batch are different in FIG. 3A. In the batching process of FIGS. 2A-2B, the key cache tensor and the value cache tensor are also required to have the same lengths across requests in the batch since the self-attention operation 225 involves multiplying the query tensor, the key cache tensor, and the value cache tensor together. However, since selective batching is performed in FIG. 3A, requests that have different lengths for its internal state can also be efficiently processed in batches for select operations while being processed separately for the self-attention operation 325.

The self-attention block 325 is coupled to receive the query tensor, the key cache tensor, and the value cache tensor for each request as the one or more input tensors and generates one or more output tensors that are attention outputs for each request in the batch. In one embodiment, the self-attention block 325 is not batched, and at least a subset of the requests in the batch are processed separately from one another. In particular, each request in the batch may be processed individually for the self-attention block 325.

For a request in the batch, the self-attention block 325 is coupled to receive the query for the request and the key cache tensor for the request to generate a multiplied tensor for the request. In one instance, an operation of the self-attention block 325 for a request is given by:

$$Y_{b\,i,j,k} = \sum_{m=1}^{h} Q'_{b\,i,j,m} \cdot Kcache'_{b\,i,m,k}$$

where $Y_b \in \mathbb{R}^{n \times L_{b,curr} \times L_{b,curr}}$ represents the multiplied tensor for request b, $Q'_b \in \mathbb{R}^{n \times L_{b,curr}}$ his a reshaped query tensor $Q_b$ for request b that concatenates the query for each attention head together for a request b, and $Kcache'_b \in \mathbb{R}^{n \times h \times L_{b,curr}}$ is a reshaped key cache tensor $Kcache_b$ for request b that concatenates the key cache tensor for each attention head together for request b.

The self-attention block 325 is then coupled to receive the multiplied tensor and the value cache tensor for the request and generate the attention output tensor for the request. In one instance, an operation of the self-attention block 325 for the request is given by:

$$P_{b\,i,j,k} = \frac{\exp\left(\frac{1}{\sqrt{h}} \cdot X_{b\,i,j,k}\right)}{\sum_{m=1}^{j} \exp\left(\frac{1}{\sqrt{h}} \cdot X_{b\,i,j,m}\right)} \text{ if } k \leq j$$

$$P_{b\,i,j,k} = 0 \text{ if } k > j,$$

Where $X_b \in \mathbb{R}^{n \times L_{b,curr} \times L_{b,curr}}$ represents the received multiplied tensor for request b, $P_b \in \mathbb{R}^{n \times L_{b,curr} \times L_{b,curr}}$ and $$Y_{b\,i,j,k} = \sum_{m=1}^{L_{b,curr}} P_{b\,i,j,m} \cdot Vcache'_{b\,i,m,k}$$

where $Y_b \in \mathbb{R}^{n \times L_{b,curr} \times h}$ represents the multiplied tensor for request b, $Vcache'_b \in \mathbb{R}^{n \times L_{b,curr} \times h}$ is the reshaped value tensor Vcache$_b$ for request b that concatenates the value cache tensor for each attention head together for request b. Subsequently the output $Y_b$ is reshaped to generate the attention output $Z'_b$ by:

$$Z'_{b\,j,hi+k} = Y_{b\,i,j,k}$$

where $Y_b \in \mathbb{R}^{n \times L_{b,curr} \times h}$ and $Z'_b \in \mathbb{R}^{L_{b,curr} \times h}$.

In particular, the operations of the self-attention block 325 may not be compatible as a batch operation for requests that have different lengths because the operations of the self-attention block 325 are multiplications between the queries, key caches, and value caches for the requests rather than tensor multiplication between a fixed weight tensor and one or more input tensors. Thus, the attention outputs for requests in the batch are generated separately. For example, an execution engine may generate a first attention output for a first request using input tensors (e.g., query tensor $Q_1$, key cache tensor Kcache$_1$, value cache tensor Vcache$_1$) for the first request, and separately, the execution engine at a separate step may generate a second attention output for a second request using input tensors for the second request. In particular, the second attention output may be generated at a different execution engine from the execution engine that processed the first request, generated at a different hardware accelerator from the hardware accelerator that processed the first request in the same execution engine, generated at a different GPU kernel from the GPU kernel that processed the first request in the same hardware accelerator, or generated at the same GPU kernel that processed the first request in the same hardware accelerator, but embodiments are not limited hereto.

The inference system 130 concatenates the attention outputs of the requests in the batch together into a single attention output tensor, since the subsequent operation in the attention linear block 330 is configured as a batch operation. In one instance, the concatenation operation is given by:

$$Z'_{i,j} = Z'_{1\,i,j}, Z'_{L_1+i,j} = Z'_{2\,i,j}, \ldots Z'_{L_1+\ldots+L_{B-1}+i,j} = Z'_{B\,i,j}$$

where $Z' \in \mathbb{R}^{\Sigma L_b \times H}$ represents the single attention output tensor. As shown in FIG. 3A, the first and second rows of the concatenated attention output tensor Z' correspond to attention outputs of the first request, the third row corresponds to the attention outputs of the second request, and the fourth through sixth rows correspond to the attention outputs of the third request.

The attention linear block 330 is coupled to receive the attention output tensor as the input tensor and generates an output tensor by applying an attention weight tensor that is a trained set of parameters of the transformer model 300 to the attention output tensor. The attention linear block 330 may be configured as one or more neural network layers. The attention linear block 330 may be executed as a batch operation. In one instance, the operation of the attention linear block 330 is given by:

$$Z_{i,j} = \left(\sum_{k=1}^{H} Z'_{i,k} \cdot W^{attn}_{k,j}\right) + \text{bias}_j$$

where $Z' \in \mathbb{R}^{\Sigma L_b \times H}$ represents the attention output tensor from the self-attention block 325, $Z \in \mathbb{R}^{\Sigma L_b \times H}$ represents the output tensor, $W^{attn} \in \mathbb{R}^{H \times H}$ is the attention weight tensor, and bias $\in \mathbb{R}^H$. As an example, in FIG. 3A, the first to second rows of the output tensor Z include the output data for the first request, the third row includes the output data for the second request, and the fourth to sixth rows includes the output data for the third request.

The first add block 335 combines the concatenated input tensor including the input token sequences and the output tensor from the attention linear block 330 to generate a combined tensor. The second layer normalization block 340 is coupled to receive the combined tensor from the add block 335 and normalize elements of each request to generate a normalized tensor as the output tensor.

Similar to the transformer model 200 of FIGS. 2A-2B, the decoder may further include a MLP block 342 that includes one or more blocks including additional neural network layers. The MLP block 342 is executed as one or more batch operations. The MLP block 342 further includes a first MLP block 345 configured as one or more neural network layers. The first MLP block 345 is coupled to receive the normalized tensor from the second layer normalization block 340 and generate an output tensor by applying a MLP weight tensor that is a trained set of parameters of the transformer model 200 to the normalized tensor.

The MLP block 342 further includes a GeLU block 350 coupled to receive the output tensor from the first MLP block 345 as the input tensor and generate an output tensor by applying a GeLU function to the input tensor. The MLP block 342 also includes a second MLP block 355 configured as one or more neural network layers. The second MLP block 355 is coupled to receive the output tensor from the GeLU block 350 as the input tensor and generate an output tensor by applying a second MLP weight tensor that is a trained set of parameters of the transformer model 300. The second add block 360 combines the output tensor from the second MLP block 355 and the output tensor from the first add block 335 to form the combined tensor.

The combined tensor includes the set of output representations for the first decoder D1. The set of output representations are propagated to subsequent decoders and a similar process is repeated to generate a set of output representations for the final decoder DN. Specifically, the inference system 130 may also deploy a selective batching method for the remaining decoders in which the self-attention operation is executed without batching but the remaining operations are batched. The LM head block 370 is coupled to receive the set of output representations from the final decoder DN and generate an output tensor $\hat{y}_1$ including a set of output tokens.

As shown in FIG. 3B, the next iteration is a decoding phase where the previous output tokens generated at the previous iteration are inputs to the transformer model 300 to generate another set of output tokens. Specifically, the layer normalization block 310 is applied to the output tensor $\hat{y}_1$ to generate a normalized tensor. The QKV operation block 315 is applied to the normalized tensor to generate the output tensor including the queries, keys, values for the current iteration. The split block 320 is applied to split the output tensor into one or more query tensors for each request, one or more key tensors for each request, and one or more value tensors for each request in the batch. The inference system 130 adds each key tensor to the key cache tensor for the respective request and adds each value tensor to the value cache for the respective request. Since FIG. 3B depicts an iteration of a decoding phase for all requests in the batch, the requests have the same lengths for the set of inputs (i.e., single output token for each request generated from the previous iteration) that are fed to the transformer model 300. However, the internal state including the key cache tensor and value cache tensor may still have different lengths for requests in the batch, since the input token lengths for the requests were different in the encoding phase illustrated in FIG. 3A. However, similar to FIG. 3A, the inference system 130 can still process a batch of requests that have different internal state lengths by selectively batching operations in the transformer model 300.

The self-attention block 325 is separately applied to the query tensor, the key cache tensor, and the value cache tensor for each respective request to generate the attention output tensor for the request. The attention outputs for the requests are concatenated into the attention output tensor. The attention linear block 330 is applied to the attention output tensor to generate an output tensor. The add block 335 combines the concatenated input tensor and the output tensor from the attention linear block 330 to generate a combined tensor. The MLP block 342 is applied to the combined tensor to generate the set of output representations for the decoder D1. This process is repeated for the remaining decoders and the LM head block 370 to generate an output tensor 92 including another set of output tokens, and the transformer model 300 is iteratively applied until the termination criteria is satisfied for each request in the batch.

By performing selective batching on select operations of the transformer model 300, the inference system 130 can efficiently process a batch of requests with variable input length. The inference system 130 executes requests by separately processing operations, such as the self-attention operation, on a per-request basis while remaining operations of the transformer model 300 are batched. Specifically, operations that involve tensor multiplication between one or more input tensors and a trained weight tensor, such as the QKV linear operation, the attention linear operation or the MLP operation, may require high computational power during the inference process since the dimensionality of the weight tensors are often large. Moreover, when the requests are individually processed for these operations, the weight tensors may be read from the local memory of an execution engine multiple times. However, by configuring these subsets of operations as batch operations but separately processing operations, such as the self-attention operation, that do not involve operations on weight tensors, the inference system 130 can utilize the parallel computation capabilities of hardware accelerators while allowing high flexibility in processing variable length requests.

In addition, FIG. 3A illustrates an iteration of the encoding phase for a set of inputs that are input token sequences and FIG. 3B illustrates an iteration of the decoding phase for a set of inputs that are output tokens for the batch of requests that were generated in a previous iteration (i.e., encoding phase). However, different from other methods of batching transformer models, the selective batching method described herein flexibly allows the transformer model 300 to process a set of inputs for a batch of requests having variable input lengths, target lengths, or internal state lengths, regardless of whether a request in the batch is processed for an encoding phase or a decoding phase or how many iterations have been processed for the request.

Specifically, a batch of requests may not be batched using the method of FIGS. 2A-2B when (i) the requests are in the encoding phase and have input token sequences with different lengths, when (ii) the requests are in the decoding phase and each request is processing a token at a different index (i.e., input token length plus the index of decoding iterations) from each other resulting in internal states with different lengths, and when (iii) each request in the batch is in a different phase (encoding or decoding) resulting in inputs with different lengths (i.e., input token sequence for encoding phase and single output token for decoding phase). While the method of batching in FIGS. 2A-2B restrict the requests in a batch to the same phase with the same number of input tokens for the encoding phase and the same token index for the decoding phase, this restriction significantly reduces the likelihood of batching in real-world workloads.

In contrast, the selective batching method described herein allows the transformer model 300 to process requests as a batch, even if they are at different phases or different indices for processing. Thus, for example, instead of receiving a set of input token sequences $X_1$, $X_2$, $X_3$, in FIG. 3A, the transformer model 300 may perform an iteration using a batch of an input token sequence for a first request (encoding phase), a first output token for a second request (first iteration of decoding phase), and a third output token for a third request (third iteration of decoding phase). As another example, the transformer model 300 may perform an iteration using a batch of a second output token for a first request and a fourth output token for a second request, each having different lengths for the key cache tensor and the value cache tensor. As described in conjunction with FIGS. 5A-5B, this allows the inference system 130 to flexibly modify and update batches at each iteration so that the computing capabilities of the one or more execution engines are fully utilized.

Moreover, while FIGS. 2A-2B and 3A-3B illustrate a GPT (generative pre-training) type transformer model that includes a set of decoders, the inference system 130 is also capable of performing selective batching on transformer models with other types of architectures, as long as the transformer model includes a attention mechanism (e.g., self-attention or encoder-decoder attention) that generates attention outputs using queries, keys, and values generated for the request, and generates output tokens in an autoregressive manner by using the output tokens generated at previous iterations as inputs for the next iteration.

In another embodiment, a transformer model may have an encoder-decoder architecture and includes a set of encoders coupled to a set of decoders. In such an architecture, each encoder includes at least a self-attention block coupled to a MLP block. The self-attention block of an encoder is coupled to receive a query tensor, a key tensor, and a value tensor obtained from processing a set of input tokens and generate an attention output. Each decoder includes at least a self-attention block coupled to an encoder-decoder attention block coupled to a MLP block. The encoder-decoder attention block of a decoder is coupled to receive a query tensor obtained from processing the output of the self-attention block and a key tensor and a value tensor obtained from processing the output of the final encoder to generate another attention output.

The inference system 130 may apply the encoder-decoder transformer model to a batch of requests. Specifically, for an encoder, the requests may be separately processed for the self-attention block while they are batched for the remaining operations. For the decoder, the requests may be separately processed for the self-attention block and the encoder-decoder attention block while they are batched for the remaining operations.

Returning to FIG. 1, the client devices 110A, 110B is a computing device such as a smartphone with an operating system such as ANDROID® or APPLE® IOS®, a tablet computer, a laptop computer, a desktop computer, or any other type of network-enabled device. In the system environment 100 shown in FIG. 1, the client device 110 allows a user to submit requests to the inference system 130 to perform tasks that can be processed by the machine-learning transformer model. For example, a user of the client device 110A may be affiliated with an entity that deploys one or more applications that require NLP or other types of tasks that can be processed by the transformer architecture. A request submitted by the client device 110 may be, for example, a request to generate predictions for chatbot applications, a request to translate a sequence of words from one language to another language, a request to synthesize a story or narrative given a sequence of starting words, and the like.

A typical client device 110 includes hardware and software needed to connect to the network 122 (e.g., via WiFi and/or 4G, 5G or other wireless telecommunication standards). Specifically, the client device 110 may include an operating system and various applications that run on the operating system that enable the users to submit the requests. For example, the client device 110 may be include browser applications or standalone applications deployed by the inference system 130 that allow users of an organization to interact with the inference system 130 to submit the requests.

The network 122 provides a communication infrastructure between the client devices 110 and the online system 130. The network 122 is typically the Internet, but may be any network, including but not limited to a Local Area Network (LAN), a Metropolitan Area Network (MAN), a Wide Area Network (WAN), a mobile wired or wireless network, a private network, or a virtual private network.

Block Diagram of Inference System

Figure 4:
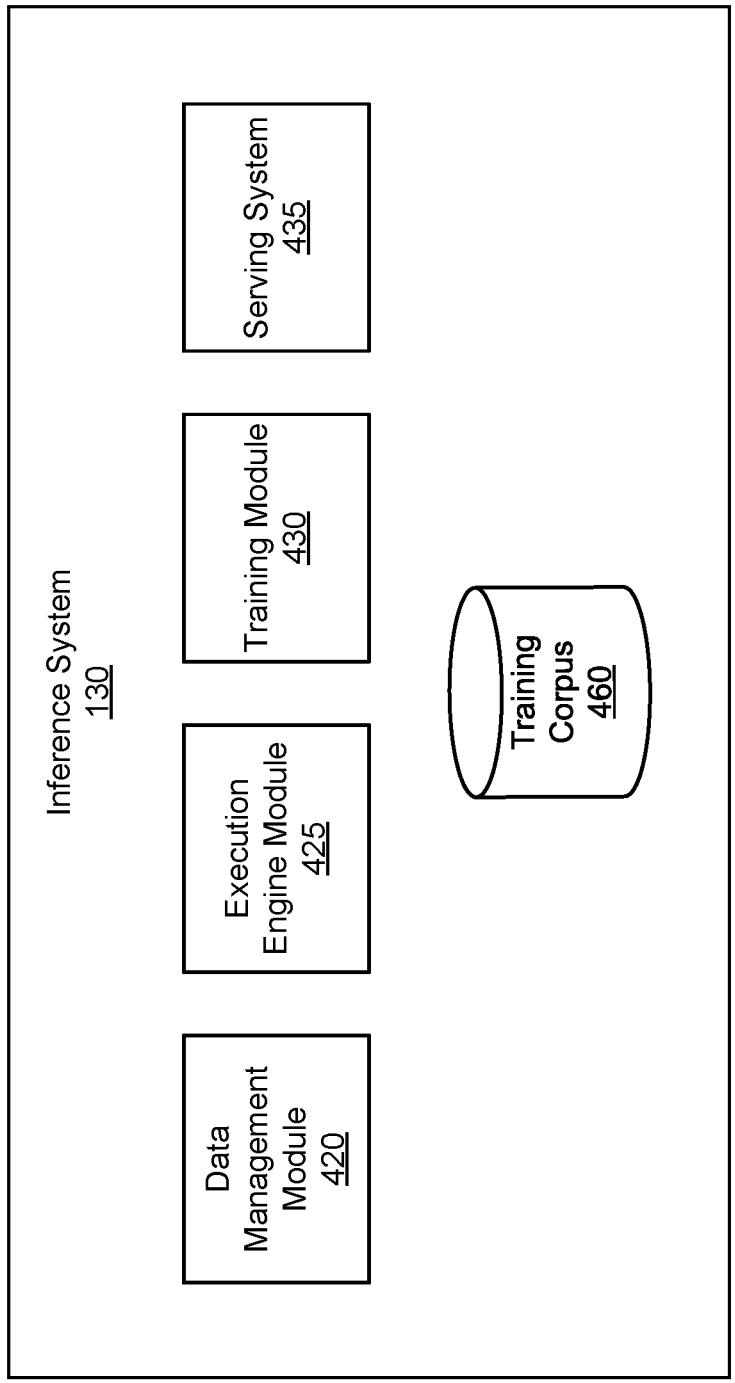
FIG. 4 is a block diagram of an inference system, in accordance with an embodiment.

FIG. 4 is a block diagram of an architecture of the inference system 130, in accordance with an embodiment. The inference system 130 shown by FIG. 4 includes a data management module 420, a training module 430, and a serving system 435. The inference system 130 also includes a training corpus 460. In alternative configurations, different and/or additional components may be included in the inference system 130.

The data management module 420 manages the training corpus 460 of training data that is used to train parameters of the transformer model. In one embodiment, the training corpus 460 includes multiple instances of data that each include a set of training input data and a set of training output data that correspond to known predictions for the set of training input data that address the task the transformer model should be trained for. In one embodiment, the training input data and the training output data is text data, but embodiments are not limited hereto, and the training data may include any type of data, such as audio data or image data, that the transformer model is trained to process in an auto-regressive manner. The training module 430 encodes the set of training input data to a set of training input tokens and the set of training output data to a set of training output tokens. Each token may represent a respective word in the latent space.

For example, when the transformer model is used for automatic translation from English to French, the set of training input tokens may correspond to a first sentence of words in English and the set of training output tokens may correspond to a second sentence of words in French that is a translation of the first sentence. As yet another example, when the transformer model is used to convert an image to text, the set of training input tokens may correspond to pieces of image data for the training image and the set of training output tokens may correspond to a converted sentence or paragraph describing the image.

The execution engine module 425 includes or more execution engines that are built on specialized hardware accelerators such as graphics processing units (GPU's) or tensor processing units (TPU's). An execution engine receives requests to execute one or more requests on the specialized hardware. In one instance, the execution engine receives a batch of requests and executes one or more iterations of the transformer model via selective batching using the inputs for each request. As described above, an execution engine may include a set of cores (e.g., GPU cores) coupled to local memory (e.g., GPU memory). Specifically, for each operation of an iteration, the execution engine is configured to read data required for the operation from the local memory of the execution engine.

The execution engines of the execution engine module 425 may be configured as GPU's or TPU's or any other specialized hardware that is capable of processing neural network operations, including tensor multiplication and floating-point operations in an efficient manner. For example, the execution engine is not limited to Google TPU, Graphcore IPU, Cerebras WSE, Nvidia GPU, intel Nervana, Qualcomm Cloud AI, Samsung Exynos, AMD Radeon, Xilinx AI Accelerator cards, IBM TrueNorth, AWS Trainium, and the like. As described above, an execution engine may be composed of one or more hardware accelerators. In some instances, the execution engine may process workload that requires processing capabilities of more than one hardware accelerator. Thus, the execution engine is able to distribute the workload across multiple hardware accelerators if necessary.

In one embodiment, an execution engine is also configured to manage one or more caches on the local memory necessary for executing one or more iterations of the transformer model. For example, when executing the transformer model 300 of FIGS. 3A-3B, the execution engine maintains a key cache tensor and a value cache tensor for a request until the request has been completed. Thus, responsive to receiving one or more new requests (requests for which the encoding phase has not been processed), an execution engine allocates memory to each request for maintaining the key cache tensor and the value cache tensor for the request. For each iteration of the decoding phase, the execution engine may add the key tensor and the value tensor for the iteration to the respective key cache and value cache allocated for the request and retrieve the key cache and value cache for the request to execute an operation. Responsive to completing one or more requests, an execution engine may provide the outputs for the requests to an appropriate module of the inference system 130, and free the allocated cache memory for the completed requests, such that the freed memory can be used for other requests.

The training module 430 trains parameters of a transformer model by performing a training process. First, the training module 430 may generate an appropriate architecture for the transformer model that can address the task requests received by the client devices 110. For example, the training module 430 may train the transformer model 300 illustrated in FIGS. 3A-3B. The training module 430 may determine the number of decoders in the set of decoders to adjust the depth of the transformer model and determine, for example, how many layers are included in each neural network layer of the transformer model. When the transformer model to be trained is an encoder-decoder architecture, the training module 430 may determine the number of encoders as well as the number of decoders.

The training module 430 may also initialize one or more weight tensors associated with the operations of the transformer model. The elements of the weight tensors correspond to parameters of the transformer model that will be learned during the training process using the training data of the training corpus 460. The weight tensors may be initialized with dimensionality based on the dimensionality of the input tensors the weight tensors are configured to be operated with. For example, to train the transformer model 300 of FIGS. 3A-3B, the training module 430 may initialize a QKV weight tensor $W^{QKV}$ for the QKV operation block 315 (e.g., with dimensionality H×3H), an attention weight tensor $W^{attn}$ for the attention linear block 330 (e.g., dimensionality H×H), and a first MLP weight tensor for the first MLP block 345 and a second MLP weight tensor for the second MLP block 355.

During the training process, the training module 430 obtains a set of training data and trains parameters of the machine-learning transformer model by repeatedly iterating between a forward pass step and a backpropagation step. During the forward pass step, the training module 430 generates one or more estimated output tokens by applying estimated parameters of the transformer model to the set of training input tokens in the set of training data to generate one or more estimated output tokens. The training module 430 determines a loss function indicating a difference between the one or more estimated output tokens and the set of training output tokens. During the backpropagation step, the training module 430 updates parameters of the transformer model (i.e., weight tensors) to reduce the loss function. This process is iteratively repeated for the next sets of training data until convergence is reached for parameters of the transformer model or a desired level of model quality is reached.

In one embodiment, the training module 430 arranges the training data in batches and executes one or more iterations of the training process on one or more execution engines. For example, each batch of training data may include a batch of input token sequences, each from a different training source. For example, a first training input token sequence may be obtained from a first text source and a second training input token sequence may be obtained from a second text source. By executing the training process with batching, the training module 430 can utilize the parallel processing capabilities of the execution engines when training the transformer model, which requires a high degree of computation.

The serving system 435 receives requests from client devices 110 to perform one or more tasks that can be processed using the trained transformer model. As described with respect to FIGS. 3A-3B, when the tasks are NLP applications, the requests may include a sequence of words (e.g., sentence in English) that the serving system 435 can parse and map into a sequence of input tokens that can be provided to the transformer model. The serving system 435 processes the request to generate one or more output tokens using the transformer model. The serving system 435 can convert the output tokens to output data, for example, a sequence of words (e.g., translated sentence in French), and return the output data as a response to the client device.

In one embodiment, the serving system 435 receives multiple requests from client devices 110 over time and forms batches of requests. The serving system 435 provides the batches to one or more execution engines. Responsive to execution by the execution engines, the serving system 435 receives one or more output tokens for the requests and provides the outputs to the client devices 110 as response to the requests. In one embodiment, the lengths of input sequences of the requests in a batch or lengths of the internal states of the requests in a batch formed by the serving system 435 can be different from one another as the execution engines are capable of processing the requests using the selective batching method. In one embodiment, the serving system 435 waits until a request is completed (i.e., the termination criteria is satisfied), and provides the outputs to the client devices 110 as response to the requests. In another embodiment, the serving system 435 provides outputs to the client devices 110 even though a request has not been completed yet. For example, the serving system 435 may provide a number (e.g., 5, 10, 15) of output tokens every time that the number of output tokens is generated for the request. As another example, for one or more time intervals (e.g., 100 ms, 200 ms) the serving system 435 may provide the output tokens generated after each time interval to the client device 110. This allows the user of the client device 110 to receive intermittent outputs even though a request has not been completed yet.

In one embodiment, the serving system 435 performs iteration-level dynamic batching for the transformer model that allows the serving system 435 to dynamically modify a batch of requests being executed on an execution engine on a per-iteration basis. Specifically, it may be difficult to modify a batch of requests once processing has started on an execution engine for certain batching methods because such methods require the length of inputs or the lengths of internal states to the transformer model be the same across the requests of the batch. That is, unless new incoming requests have the same length of inputs and internal states as the batch of requests being executed, it is difficult for the inference system to modify the batch to, for example, add new requests to the batch.

By performing selective batching, the serving system 435 can monitor and modify a batch processed on the execution engine per iteration. Specifically, at one or more iterations, the serving system 435 can modify the batch being executed on the execution engine by adding new incoming requests to the batch or removing completed requests from the batch. This is because selective batching allows requests with variable lengths to be processed without restraining the inputs or the internal states to the transformer model to the same lengths. This allows the serving system 435 to provide the response for completed requests earlier to the client device 110 of the request and allows addition of new requests to a batch if the execution engine processing the batch is being under-utilized, even if the lengths for the new requests are different from lengths of the existing requests for the next iteration.

Dynamic Batching for Transformer Model

FIGS. 5A-5D illustrate a method of dynamic batching for processing requests using a machine-learning transformer model, in accordance with an embodiment. In one embodiment, the serving system 435 includes a request processor 580 and a scheduler 585 each coupled to the one or more execution engines. The request processor 580 receives requests and forwards the requests to the scheduler 585. The request processor 580 maintains a completion queue for storing outputs of completed requests. Specifically, the request processor 580 receives outputs for completed requests from the execution engines and stores the outputs in the completion queue such that they can be provided to the client devices 110 of the requests. The scheduler 585 receives the forwarded requests from the request processor 580 and maintains an incoming request queue for storing new requests to be processed. The scheduler 585 forms a batch of requests and schedules the batch for execution on an execution engine. In one embodiment, the scheduler 585 is configured to monitor which batch of requests were distributed to each execution engine and how many iterations of the transformer model have been performed for each request and whether the request has been completed. The scheduler 585 is also configured to monitor the available cache memory in each execution engine.

Figure 5A:
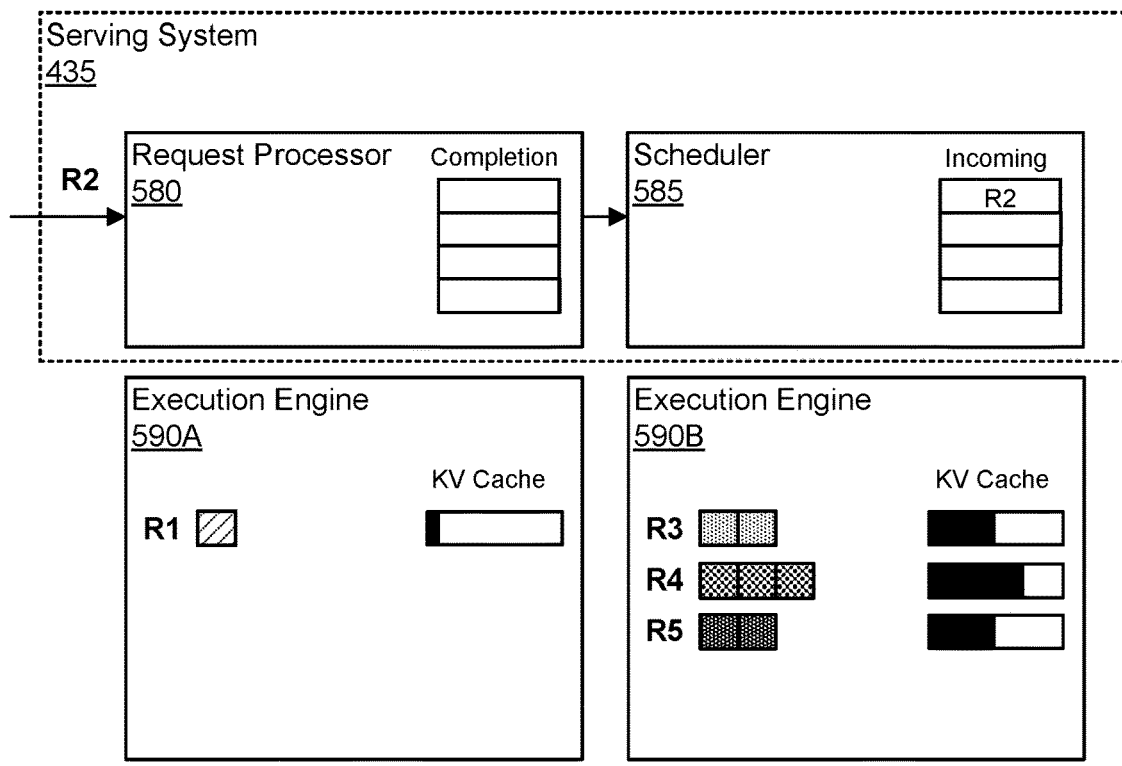
FIGS. 5A-5D illustrate a method of dynamic batching for processing requests using a machine-learning transformer model, in accordance with an embodiment.

Specifically, FIG. 5A illustrates a request processor 580 and a scheduler 585 coupled to execution engines 590A and 590B. In FIG. 5A, execution engine 590A is scheduled to execute a single request R1, and execution engine 590B is scheduled to execute a batch of requests R3, R4, R5. Specifically, for the first iteration of FIG. 5A, request R1 in execution engine 590A includes a single input token. On the other hand, request R3 in the execution engine 590B includes a sequence of two input tokens, request R4 includes a sequence of three input tokens, and request R5 includes a sequence of two input tokens.

The request processor 580 receives a new request R2 and forwards request R2 to the scheduler 585. The scheduler 585 stores request R2 in the incoming request queue. An iteration of the transformer model is executed on the execution engines 590A, 590B. For example, the iteration may be an encoding phase for a certain request in current executing batch. In particular, a key cache tensor and value cache tensor are allocated for each request as the internal state cache, and a part of the cache for each request is used to store the keys and values after the encoding phase. In one embodiment, the allocation of the internal state cache for a request is based on the maximum output token length the transformer model is configured to generate. For example, a transformer model may be configured to generate a maximum number of 1024 output tokens, and the execution engine may allocate an internal state cache configured to store up to 1024 elements for each key cache tensor and value cache tensor. In another embodiment, when a user of the request specifies a maximum length of output tokens that can be returned as the response, and the execution engine may allocate an internal state cache configured to store up to the maximum length of elements specified in the request for each tensor. In yet another embodiment, the execution engine may determine the initial number of input tokens for the request, and the execution engine may initially allocate an internal state cache that is large enough to store the number of input tokens plus some additional amount of memory. The execution engine may incrementally allocate more memory to the internal state cache as the transformer model is iteratively applied for the request if the initially allocated memory is insufficient. The scheduler 585 monitors the cache memory for execution engines 590A and 590B. Responsive to determining that execution engine 590A has cache memory available for processing request R2, the scheduler 585 updates the batch for execution engine 590A to include the new request R2 and instructs the execution engine 590A to execute the updated batch for the next iteration.

Figure 5B:
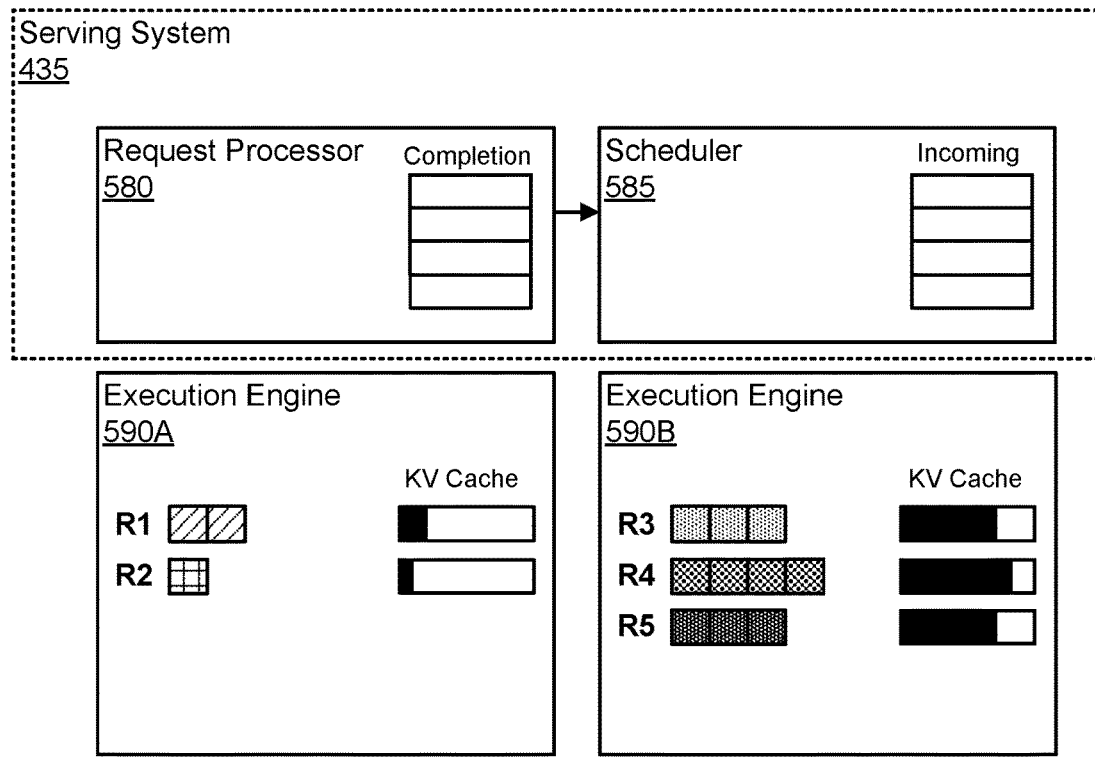

As shown in FIG. 5B, after executing the first iteration, a first output token is generated for request R1 in the execution engine 590A and requests R3, R4, R5 in the execution engine 590B. Moreover, execution engine 590A is now scheduled to execute an updated batch of requests R1, R2 at the second iteration. The request R2 includes a single input token. In particular, since the first output token has been generated for request R1, the second iteration for request R1 may be a decoding phase, while the second iteration for request R2 may be an encoding phase. Thus, because an execution engine is configured to perform selective batching and is capable of processing requests with different lengths, execution engine 590A can perform both the encoding phase and the decoding phase for the same batch of requests, as described in conjunction with FIGS. 3A-3B. This may not be feasible for other batching methods as there is no guarantee that the length of input tokens for one request will be the same as the length of input tokens and output tokens for an existing request in the batch. As shown in FIG. 5B, an additional part of the cache for each request is used to store the keys and values after the second iteration.

Figure 5C:
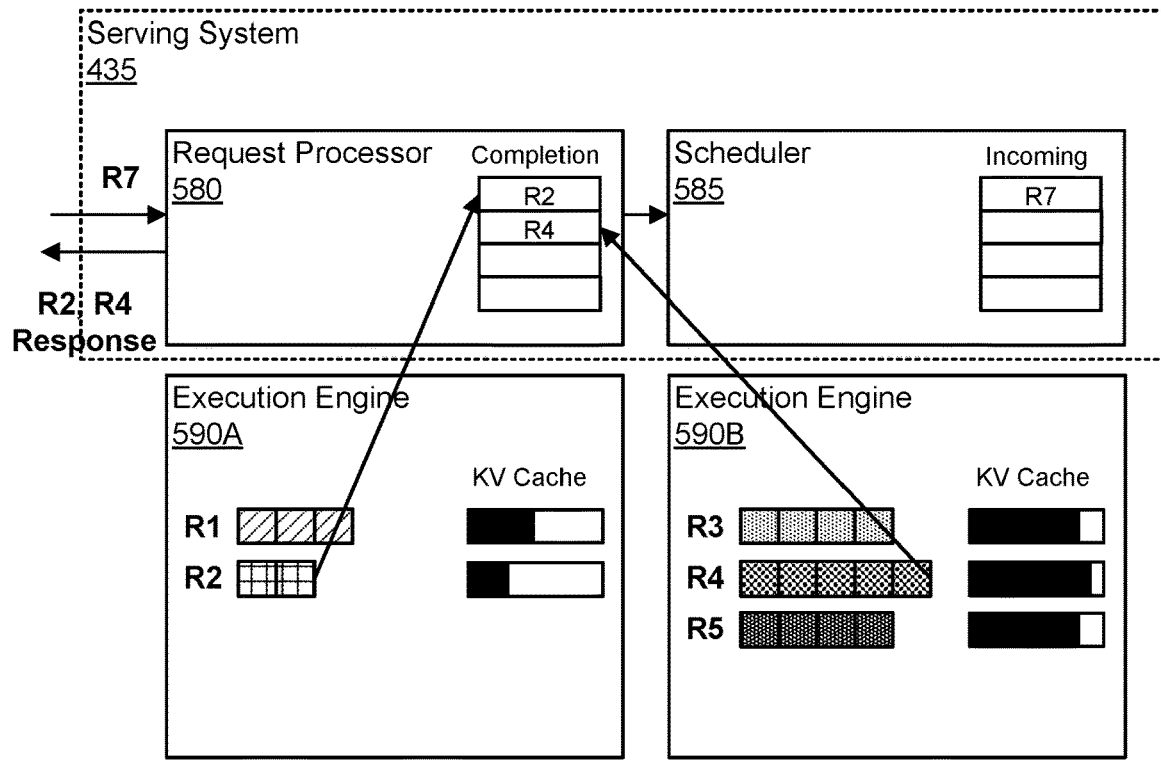

As shown in FIG. 5C, after executing the second iteration, a second output token is generated for request R1 in execution engine 590A and requests R3, R4, R5 in the execution engine 590B. A first output token is generated for request R2 in execution engine 590A. Specifically, the first output token generated for request R2 is generated with an end token and the execution engine 590A provides the outputs for request R2 to the completion queue of the request processor 580. The execution engine 590A frees the cache memory allocated to request R2. The second output token generated for request R4 is also generated with an end token and the execution engine 590B provides the outputs for request R4 to the completion queue of the request processor 580. The execution engine 590B frees the cache memory allocated to request R4. The request processor 580 forwards the outputs of the completion queue to the client devices 110 of the completed requests.

The request processor 580 also receives another new request R7 and forwards the request to the scheduler 585. The scheduler 585 stores the request R7 in the incoming request queue. Responsive to determining that requests R2, R4 are completed and that execution engine 590A has cache memory available for processing request R7, the scheduler 585 updates the batch for execution engine 590A to R1, R7 and updates the batch for execution engine 590B to R3, R5. The scheduler 585 instructs the execution engines 590A, 590B to execute the updated batches. Thus, by dynamically adjusting the batches at an iteration, completed requests can be provided to the client devices 110 of the requests as soon as processing is completed, and the scheduler 585 can schedule new requests within the batch such that the computing capabilities of an execution engine can be utilized when the memory of the completed request is freed up.

Figure 5D:
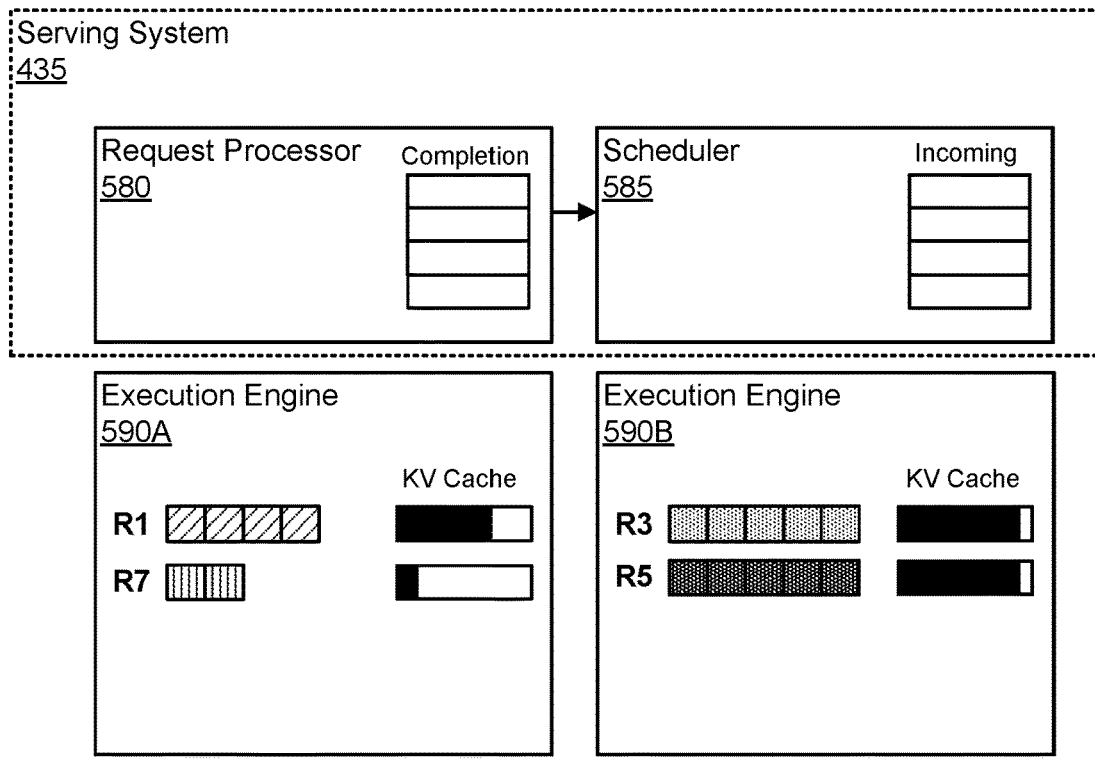

As shown in FIG. 5D, after executing the third iteration, a third output token is generated for request R1 in the execution engine 590A and requests R3, R5 in the execution engine 590B. Moreover, execution engine 590A is now scheduled to execute an updated batch of requests R1, R7 at the fourth iteration and execution engine 590B is now scheduled to execute an updated batch of requests R3, R5 at the fourth iteration. The request R7 includes a sequence of two input tokens. A similar process to that described in FIGS. 5A-5D may be continuously performed as the serving system 435 receives requests from client devices 110.

As described above, dynamic batching allows the serving system 435 to dynamically adjust batches that are processed on the execution engines such that the hardware of the execution engine can be fully utilized. This process was not available for certain methods of batching (e.g., method of FIGS. 2A-2B) for transformer models, because internal states, such as the key cache tensor and value cache tensor, maintain variable length per iteration in a transformer model, while other recurrent machine-learning models (e.g., RNN's) make use of state data that have the same lengths across a batch of requests.

Flowchart Illustrating Method of Selective Batching and Dynamic Batching

Figure 6A:
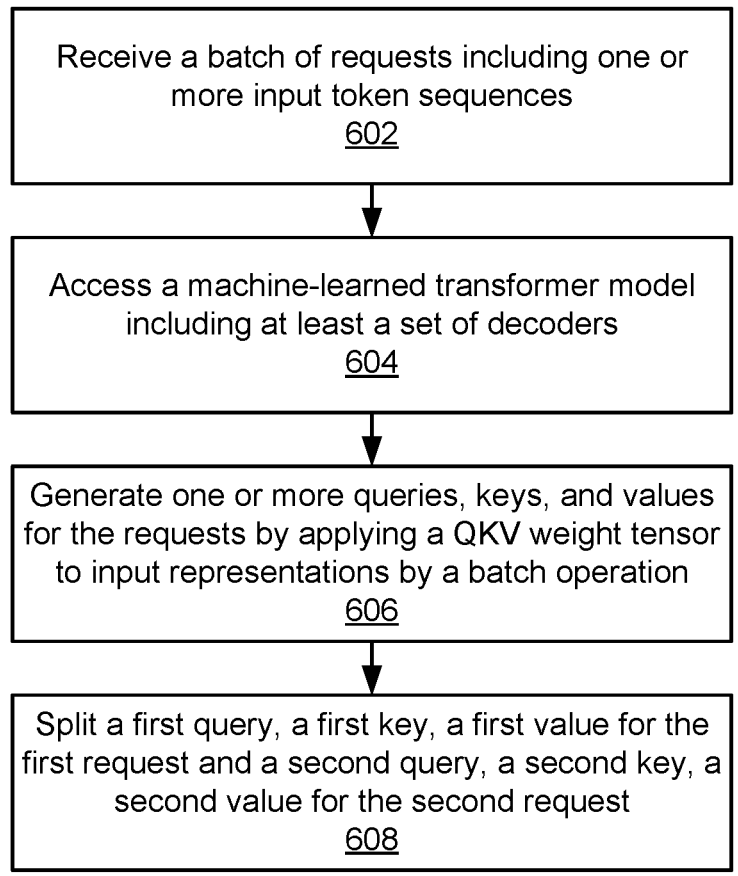
FIGS. 6A-6B is a flowchart illustrating a method of selective batching using the transformer model, in accordance with an embodiment.
Figure 6B:
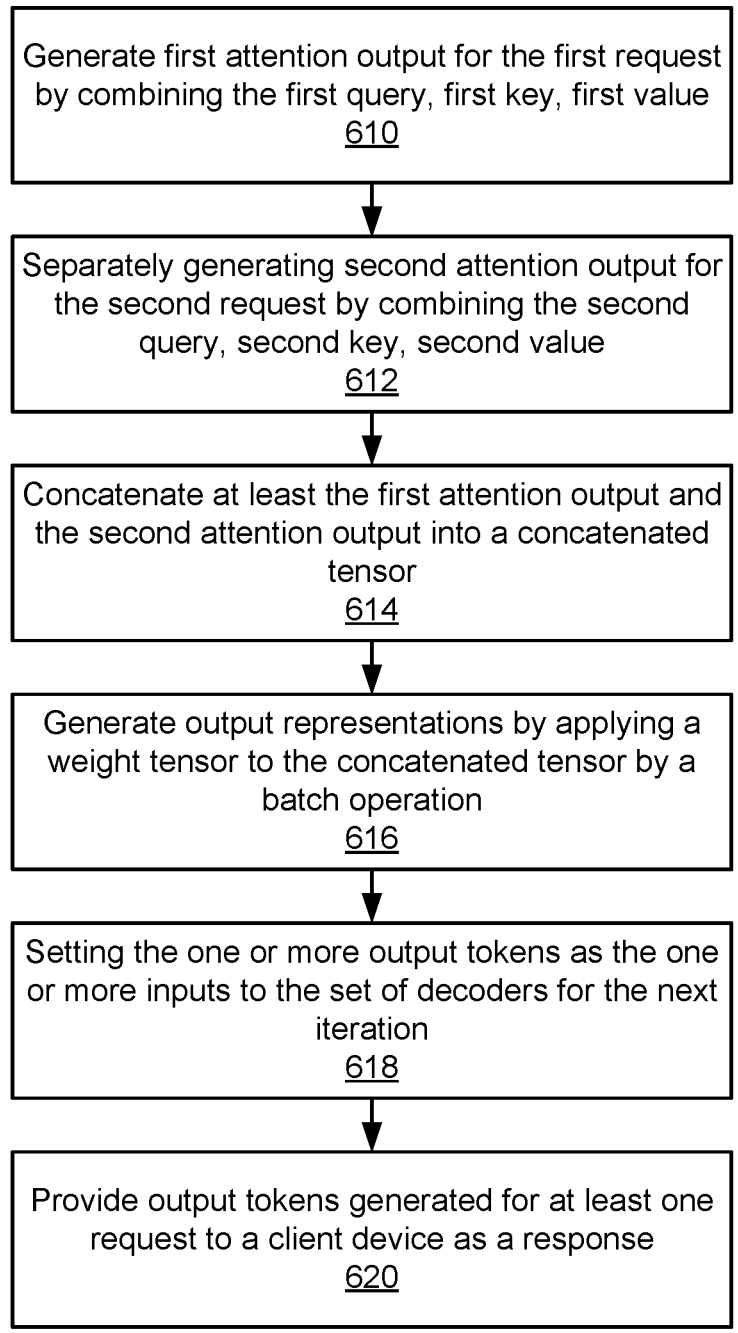

FIGS. 6A-6B is a flowchart illustrating a method of selective batching using the transformer model, in accordance with an embodiment. The inference system 130 receives 602 a batch of requests including one or more input token sequences. In one instance, a length of a first token sequence for a first request in the batch may be different from a length of a second token sequence for a second request in the batch. The inference system 130 accesses 604 a machine-learning transformer model including at least a set of decoders.

For one or more iterations, the inference system 130 repeatedly performs the steps of applying the set of decoders to one or more inputs for the requests. Specifically, for at least one decoder in the set, the inference system 130 generates 606 one or more queries, one or more keys, and one or more values for the requests by applying a QKV weight tensor to one or more input representations. The queries, keys, and values may be generated by a batch operation. The inference system 130 splits 608 a first query for the first request from the one or more queries, a first key for the first request from the one or more keys, and a first value for the first request from the one or more values. The inference system 130 also splits a second query for the second request from the one or more queries, a second key for the second request from the one or more keys, and a second value for the second request from the one or more values.

The inference system 130 generates 610 a first attention output for the first request by at least combining the first query, the first key, and the first value. The inference system 130 separately generates 612 a second attention output for the second request by combining the second query, the second key, and the second value for the second request. The inference system concatenates 614 at least the first attention output and the second attention output into a concatenated tensor. The inference system 130 generates 616 one or more output representations by applying a weight tensor to the concatenated tensor. The one or more output representations may be generated by a batch operation. The inference system 130 sets 618 the one or more output tokens as the one or more inputs to the set of decoders for a next iteration. The inference system 130 provides 620 output tokens generated for at least one request to a client device 110 as a response to the at least one request.

Figure 7:
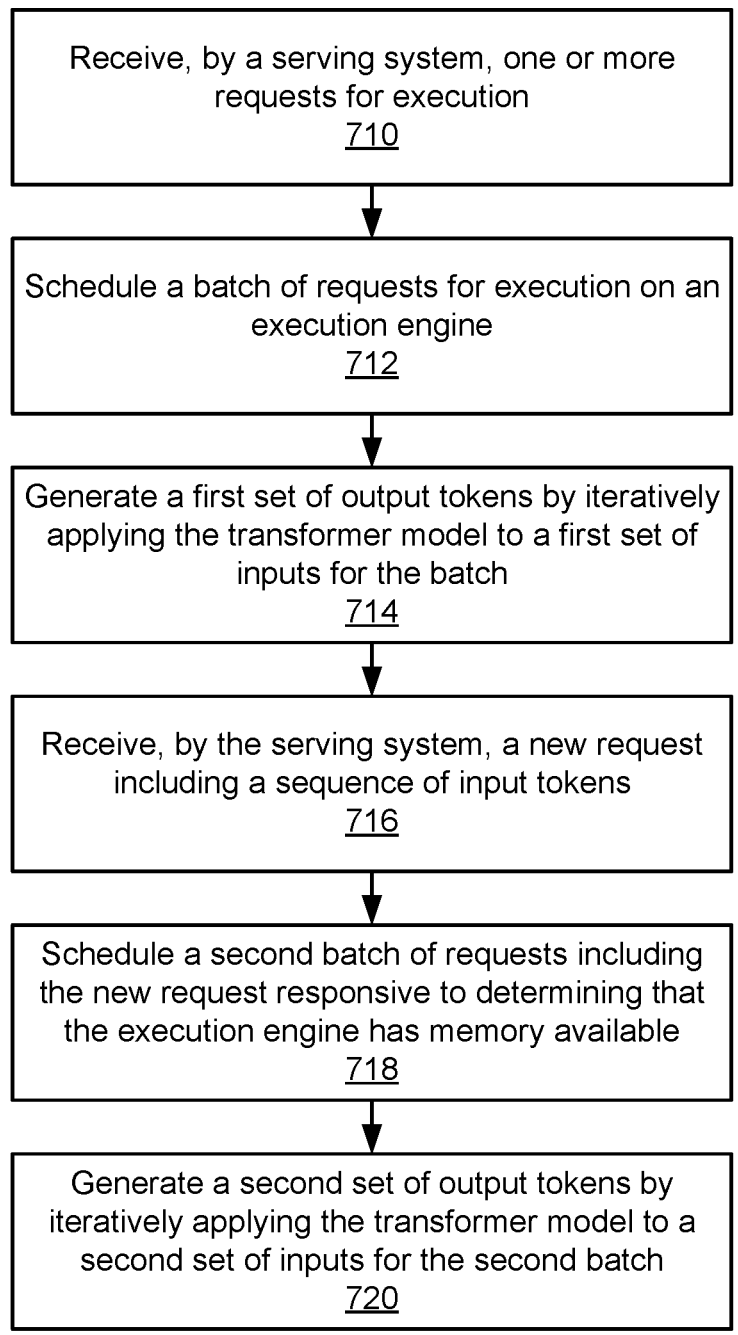
FIG. 7 is a flowchart illustrating a method of dynamic batching for processing requests using the transformer model, in accordance with an embodiment.

FIG. 7 is a flowchart illustrating a method of dynamic batching for processing requests using the transformer model, in accordance with an embodiment. The inference system 130 receives 710, by a serving system, one or more requests for execution. The serving system including a scheduler and one or more execution engines each coupled to access a machine-learning transformer model including at least a set of decoders. The inference system 130 schedules 712, by the scheduler, a batch of requests including the one or more requests for execution on an execution engine. The inference system 130 generates 714, by the execution engine, a first set of output tokens by iteratively applying the transformer model to a first set of inputs for the batch of requests. Applying the transformer model includes applying at least one batch operation to one or more input tensors associated with the batch of requests.

The inference system 130 receives 716, by a request processor, a new request from a client device. The new request may include a sequence of input tokens. The inference system 130 schedules 718, by the scheduler, a second batch of requests including the one or more requests and the new request for execution on the execution engine responsive to determining that the execution engine has memory available to execute the second batch of requests. The inference system 130 generates 720, by the execution engine, a second set of output tokens by iteratively applying the transformer model to a second set of inputs for the second batch of requests including the sequence of input tokens for the new request.

Hardware Components

Figure 8:
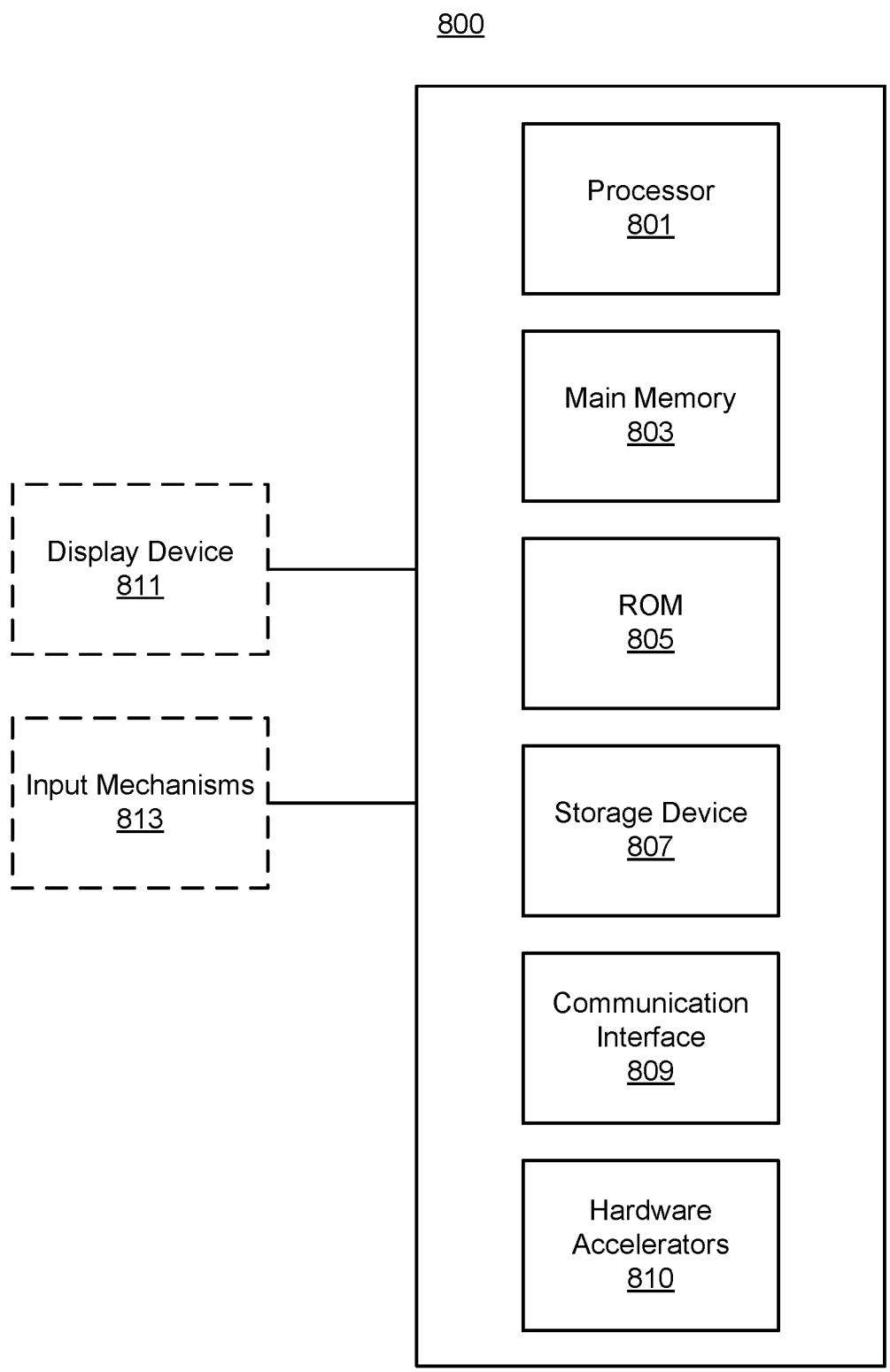
FIG. 8 is a diagram illustrating a computer system upon which embodiments described herein may be implemented within the inference system, in accordance with an embodiment.

FIG. 8 is a diagram illustrating a computer system 800 upon which embodiments described herein may be implemented within the inference system 130. For example, in the context of FIG. 1, the inference system 130 and its sub-systems may be implemented using a computer system such as described by FIG. 8. The inference system 130 and its sub-systems may also be implemented using a combination of multiple computer systems as described by FIG. 8.

In one implementation, the computer system 800 includes processing resources 801, main memory 803, read only memory (ROM) 805, storage device 807, a communication interface 809, and hardware accelerators 810. The computer system 800 includes at least one processor 801 including CPU cores for processing information and a main memory 803, such as a random-access memory (RAM) or other dynamic storage device, for storing information and instructions to be executed by the processor 801. Main memory 803 also may be used for storing temporary variables or other intermediate information during execution of instructions to be executed by processor 801. The computer system 800 may also include ROM 805 or other static storage device for storing static information and instructions for processor 801. The storage device 807, such as a magnetic disk or optical disk or solid-state memory device, is provided for storing information and instructions. For example, in the context of FIG. 4, the training corpus store 460 of the inference system 130 may be stored in the read only memory (ROM) 805 or the storage device 807. The computer system 800 also includes one or more hardware accelerators 810. As described above, while an execution engine may be configured with the one or more hardware accelerators 810 in a single computer system 800, in another embodiment, an execution engine may be configured across multiple hardware accelerators 810 that are distributed across multiple computer systems 800.

The communication interface 809 can enable the inference system 130 to communicate with client devices 110 through use of a communication link (wireless or wireline). Using the communication link, the inference system 130 can communicate with the different sub-systems included in a client device 110 to enable receiving and processing of requests. In addition, when an execution engine is configured across multiple hardware accelerators that are distributed across multiple computer systems 800, the communication interface 809 can also enable communication between the multiple computer systems 800, such that an execution engine can process requests across the multiple hardware accelerators 810.

The computer system 800 can optionally include a display device 811, such as a cathode ray tube (CRT), an LCD monitor, an LED monitor, a TFT display or a television set, for example, for displaying graphics and information to a user. An input mechanism 813, such as a keyboard that includes alphanumeric keys and other keys, can optionally be coupled to the computer system 800 for communicating information and command selections to processor 801. Other non-limiting, illustrative examples of input mechanisms 813 include a mouse, a trackball, touch-sensitive screen, or cursor direction keys for communicating direction information and command selections to processor 801 and for controlling cursor movement on display device 811.

Examples described herein are related to the use of the inference system 130 for implementing the techniques described herein. According to one embodiment, those techniques are performed by the inference system 130 in response to processor 801 executing one or more sequences of one or more instructions contained in main memory 803. Such instructions may be read into main memory 803 from another machine-readable medium, such as storage device 807. Execution of the sequences of instructions contained in main memory 803 causes processor 801 to perform the process steps described herein. In alternative implementations, hard-wired circuitry may be used in place of or in combination with software instructions to implement examples described herein. Thus, the examples described are not limited to any specific combination of hardware circuitry and software.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer-readable storage medium storing computer program instructions executable to perform operations comprising:
   receiving, by a serving system, one or more requests for execution, the serving system including one or more execution engines each coupled to access a machine-learning transformer model;
   scheduling a batch of requests including the one or more requests for execution on an execution engine;
   generating, by the execution engine, a first set of output tokens by applying the transformer model to a first set of inputs for the batch of requests, wherein applying the transformer model comprises applying at least one batch operation to one or more input tensors associated with the batch of requests;
   obtaining a sequence of input tokens for a new request;
   scheduling a second batch of requests for execution on the execution engine, the second batch of requests including the new request and at least one request in the batch of requests, wherein a length of an internal state for the new request is a length of keys or values for the new request of an attention operation of the machine-learning transformer model, wherein a length of another internal state for the at least one request is a length of keys or values for the at least one request of the attention operation, wherein the length of the internal state for the new request is different from the length of the another internal state for the at least one request; and
   generating, by the execution engine, a second set of output tokens by applying the transformer model to a second set of inputs for the second batch, wherein a key or value is added to the internal state for the new request and another key or value is added to the another internal state for the at least one request.

2. The non-transitory computer-readable storage medium of claim 1, wherein an input for the at least one request in the second set of inputs comprises at least two tokens.

3. The non-transitory computer-readable storage medium of claim 1, wherein the at least two tokens for the at least one request comprises one or more output tokens from the first set of output tokens.

4. The non-transitory computer-readable storage medium of claim 1, the operations further comprising:
   iteratively generating a third set of output tokens for the at least one request; and
   responsive to determining that the third set of output tokens reaches a threshold number, providing the third set of output tokens.

5. The non-transitory computer-readable storage medium of claim 1, wherein the second batch of requests is scheduled responsive to determining that the execution engine has memory available to execute the second batch of requests.

6. The non-transitory computer-readable storage medium of claim 1, wherein the at least one request is associated with a cache in the execution engine for storing elements of the another internal state for the at least one request, and responsive to determining that the at least one request has been completed, freeing the cache for the at least one request in the execution engine.

7. The non-transitory computer-readable storage medium of claim 1,
wherein the internal state includes a key cache storing keys generated for the new request or a value cache storing values generated for the new request,
wherein the another internal state includes another key cache storing keys generated for the at least one request or another value cache storing values generated for the at least one request, and
wherein a length of the key cache is different from a length of the another key cache or a length of the value cache is different from a length of the another value cache.

8. The non-transitory computer-readable storage medium of claim 7, wherein the length of the key cache is a number of keys for the new request and the length of the another key cache is a number of keys for the at least one request, and wherein the length of the value cache is a number of values for the new request and the length of the another value cache is a number of values for the at least one request.

9. The non-transitory computer-readable storage medium of claim 1, wherein the length of the sequence of input tokens for the new request is different from the length of the another sequence of input tokens for the at least one request.

10. The non-transitory computer-readable storage medium of claim 9, wherein the length of the sequence of input tokens is a number of input tokens in the sequence and the length of the another sequence of input tokens is a number of input tokens in the another sequence.

11. The non-transitory computer-readable storage medium of claim 1, wherein applying the at least one batch operation to the one or more input tensors associated with the batch of requests further comprises:
concatenating the one or more input tensors associated with the batch of requests into a concatenated input tensor; and
applying an operation for the batch operation to the concatenated input tensor to generate an output tensor.

12. The non-transitory computer-readable storage medium of claim 11, wherein concatenating the one or more input tensors comprises concatenating elements of the one or more input tensors along one dimension.

13. The non-transitory computer-readable storage medium of claim 1, wherein each token in the sequence of input tokens represents a text unit.

14. The non-transitory computer-readable storage medium of claim 1, wherein applying the transformer model to the first set of inputs further comprises applying an attention operation to the first set of inputs, and wherein the attention operation is configured to obtain queries, keys, values for the first set of inputs and generate attention outputs by combining the queries, the keys, and the values.

15. The non-transitory computer-readable storage medium of claim 1, wherein applying the transformer model to the second set of inputs further comprises applying an attention operation to the second set of inputs, and wherein the attention operation is configured to obtain queries, keys, values for the second set of inputs and generate attention outputs by combining the queries, the keys, and the values.

16. The non-transitory computer-readable storage medium of claim 15, wherein applying the attention operation to the second set of inputs further comprises:
generating a first attention output for the at least one request by combining a first query, a first key, and a first value for the at least one request, and
separately generating a second attention output for the new request by combining a second query, a second key, and a second value for the new request.

17. The non-transitory computer-readable storage medium of claim 1, wherein a length of the sequence of input tokens for the new request is different from a length of another sequence of input tokens for the at least one request.

18. A method comprising:
receiving, by a serving system, one or more requests for execution, the serving system including one or more execution engines each coupled to access a machine-learning transformer model;
scheduling a batch of requests including the one or more requests for execution on an execution engine;
generating, by the execution engine, a first set of output tokens by applying the transformer model to a first set of inputs for the batch of requests, wherein applying the transformer model comprises applying at least one batch operation to one or more input tensors associated with the batch of requests;
obtaining a sequence of input tokens for a new request;
scheduling a second batch of requests for execution on the execution engine, the second batch of requests including the new request and at least one request in the batch of requests, wherein a length of an internal state for the new request is a length of keys or values for the new request of an attention operation of the machine-learning transformer model, wherein a length of another internal state for the at least one request is a length of keys or values for the at least one request of the attention operation, wherein the length of the internal state for the new request is different from the length of the another internal state for the at least one request; and
generating, by the execution engine, a second set of output tokens by applying the transformer model to a second set of inputs for the second batch, wherein a key or value is added to the internal state for the new request and another key or value is added to the another internal state for the at least one request.

19. The method of claim 18, wherein an input for the at least one request in the second set of inputs comprises at least two tokens.

20. The method of claim 19, wherein the at least two tokens for the at least one request comprises one or more output tokens from the first set of output tokens.

21. The method of claim 18, further comprising:
iteratively generating a third set of output tokens for the at least one request; and
responsive to determining that the third set of output tokens reaches a threshold number, providing the third set of output tokens.

22. The method of claim 18, wherein the second batch of requests is scheduled responsive to determining that the execution engine has memory available to execute the second batch of requests.

23. The method of claim 18, wherein the at least one request is associated with a cache in the execution engine for storing elements of the another internal state for the at least one request, and responsive to determining that the at least one request has been completed, freeing the cache for the at least one request in the execution engine.

24. The method of claim 18,
wherein the internal state includes a key cache storing keys generated for the new request or a value cache storing values generated for the new request,
wherein the another internal state includes another key cache storing keys generated for the at least one request or another value cache storing values generated for the at least one request, and
wherein a length of the key cache is different from a length of the another key cache or a length of the value cache is different from a length of the another value cache.

25. The method of claim 24, wherein the length of the key cache is a number of keys for the new request and the length of the another key cache is a number of keys for the at least one request, and wherein the length of the value cache is a number of values for the new request and the length of the another value cache is a number of values for the at least one request.

26. The method of claim 18, wherein the length of the sequence of input tokens for the new request is different from the length of the another sequence of input tokens for the at least one request.

27. The method of claim 26, wherein the length of the sequence of input tokens is a number of input tokens in the sequence and the length of the another sequence of input tokens is a number of input tokens in the another sequence.

28. The method of claim 18, wherein applying the at least one batch operation to the one or more input tensors associated with the batch of requests further comprises:
concatenating the one or more input tensors associated with the batch of requests into a concatenated input tensor; and
applying an operation for the batch operation to the concatenated input tensor to generate an output tensor.

29. The method of claim 28, wherein concatenating the one or more input tensors comprises concatenating elements of the one or more input tensors along one dimension.

30. The method of claim 18, wherein each token in the sequence of input tokens represents a text unit.

31. The method of claim 18, wherein applying the transformer model to the first set of inputs further comprises applying an attention operation to the first set of inputs, and wherein the attention operation is configured to obtain queries, keys, values for the first set of inputs and generate attention outputs by combining the queries, the keys, and the values.

32. The method of claim 18, wherein applying the transformer model to the second set of inputs further comprises applying an attention operation to the second set of inputs, and wherein the attention operation is configured to obtain queries, keys, values for the second set of inputs and generate attention outputs by combining the queries, the keys, and the values.

33. The method of claim 32, wherein applying the attention operation to the second set of inputs further comprises:
generating a first attention output for the at least one request by combining a first query, a first key, and a first value for the at least one request, and separately generating a second attention output for the new request by combining a second query, a second key, and a second value for the new request.

34. The method of claim 18, wherein a length of the sequence of input tokens for the new request is different from a length of another sequence of input tokens for the at least one request.

\* \* \* \* \*